United States Patent [19]

Stanford

[11] Patent Number: 4,915,048
[45] Date of Patent: Apr. 10, 1990

[54] VESSEL WITH IMPROVED HYDRODYNAMIC PERFORMANCE

[75] Inventor: Ulf H. Stanford, San Anselmo, Calif.

[73] Assignee: Corwin R. Horton, Kentfield, Calif.; a part interest

[21] Appl. No.: 264,708

[22] Filed: Oct. 27, 1988

Related U.S. Application Data

[63] Continuation-in-part of Ser. No. 43,677, Apr. 28, 1987, abandoned.

[51] Int. Cl.⁴ .................................................. B63B 1/32
[52] U.S. Cl. ...................................... 114/56; 114/274
[58] Field of Search .................... 114/56, 57, 270, 271, 114/274

[56] References Cited

U.S. PATENT DOCUMENTS

| 2,191,904 | 2/1940 | Baker | 114/56 |
| 2,341,159 | 2/1944 | Neklutin | 114/66.5 |

(List continued on next page.)

FOREIGN PATENT DOCUMENTS

| 0214694 | 12/1987 | European Pat. Off. |
| 399710 | 7/1924 | Fed. Rep. of Germany |
| 1071803 | 9/1954 | France |
| 2948 | of 1910 | United Kingdom |
| 319982 | 10/1929 | United Kingdom |

(List continued on next page.)

OTHER PUBLICATIONS

Lang et al., Design and Development of the 190-Ton Stable Semisubmerged Platform (SSP), J. of Engineering for Industry, pp. 1105-1111, Nov. 1974.
Stebbins, SeaKnife Arriving, Proceedings, Feb. 1985, pp. 113-118.

*Primary Examiner*—Sherman D. Basinger
*Assistant Examiner*—Stephen P. Avila
*Attorney, Agent, or Firm*—Corwin R. Horton

[57] ABSTRACT

Planing vessels of improved performance capability and methods for improving such performance and foils which may be associated with a planing vessels for providing improved performance capability. A dynamic downward force generated as the vessel (1) moves through water, preferably by a foil (3), is imposed on the vessel, with the locus of the force positioned, in the traverse direction, at the longitudinal vertical centerline plane of the vessel. In the longitudinal direction the locus of the dynamic force is positioned, relative to the other forces acting fore-to-aft on the vessel, to decrease the trim angle of the vessel, desirably to less than two degrees. Vessel wetted surface configurations are provided for stable and efficient operation at low trim angles, including the following. A deep draft, fine entrance (32) which minimizes rise at the bow experienced with conventional planing vessels and assists in maintaining laminarity of flow at the planing surfaces. A foil (31) extending along the bowpeak below the waterline and spaced forwardly thereof to streamline the flow passing the bow to thereby decrease spray and turbulence. A skeg (32) extending downward at the bottom of the hull at the entrance along the longitudinal centerline plane which improves directional stability and also assists in maintaining flow laminarity. A sweptback wing located at the entrance, preferably mounted at the lower margin of the skeg positioned with an angle of attack which generates an upward force to improve the vessel stability against pitch and yaw in disturbed water. An aftmidships planing floor (11) having a rise from midships to the stern trailing edge desirably from 50% to 100% of the midships draft improves the stability of the vessel when operated at trim. A release floor (21) extending aftward 5 to 25% of the waterline length of the vessel, preferably from a transverse step (4), and rising over this length 10 to 50% of the midships draft to a transverse trailing edge (22). The trailing edge and the release floor, in the transverse direction, are parallel with base plane of the vessel. The pressure release floor reduces the pressure on the aftward flow to separation at the trailing edge in a gradual and uniform manner which reduces drag. The foil to generate a downward force in the flow desirably is positioned below the stern trailing edge and contoured to produce minimum induced drag and to divert the flow at its trailing edge downwardly so as to reduce turbulence and drag at the stern.

55 Claims, 4 Drawing Sheets

U.S. PATENT DOCUMENTS

| | | | |
|---|---|---|---|
| 3,225,728 | 12/1965 | Nomura et al. | 114/66.5 |
| 3,391,667 | 7/1968 | Lo Bue | 114/66.5 |
| 3,709,179 | 1/1973 | Payne | 114/66.5 P |
| 3,760,756 | 9/1973 | Boden | 114/66.5 R |
| 4,027,613 | 6/1977 | Wollard | 114/291 |
| 4,193,366 | 3/1980 | Salminen | 114/39 |
| 4,237,810 | 12/1980 | Westfall | 114/272 |
| 4,655,157 | 4/1987 | Sapp | 114/56 |
| 4,665,853 | 5/1987 | Gerdsen et al. | 114/61 |
| 4,726,310 | 2/1988 | Ard et al. | 114/56 |
| 4,742,793 | 5/1988 | Mader | 114/56 |
| 4,748,929 | 6/1988 | Payne | 114/280 |

FOREIGN PATENT DOCUMENTS

| | | |
|---|---|---|
| 700771 | 12/1953 | United Kingdom . |
| 1164340 | 9/1969 | United Kingdom . |
| 1383070 | 2/1975 | United Kingdom . |
| 2082125 | 3/1982 | United Kingdom . |

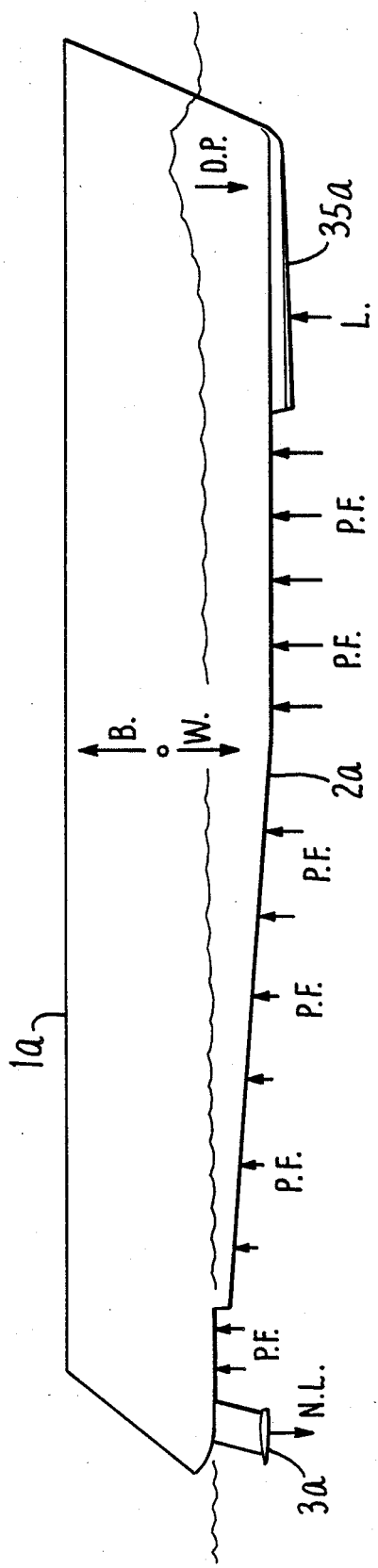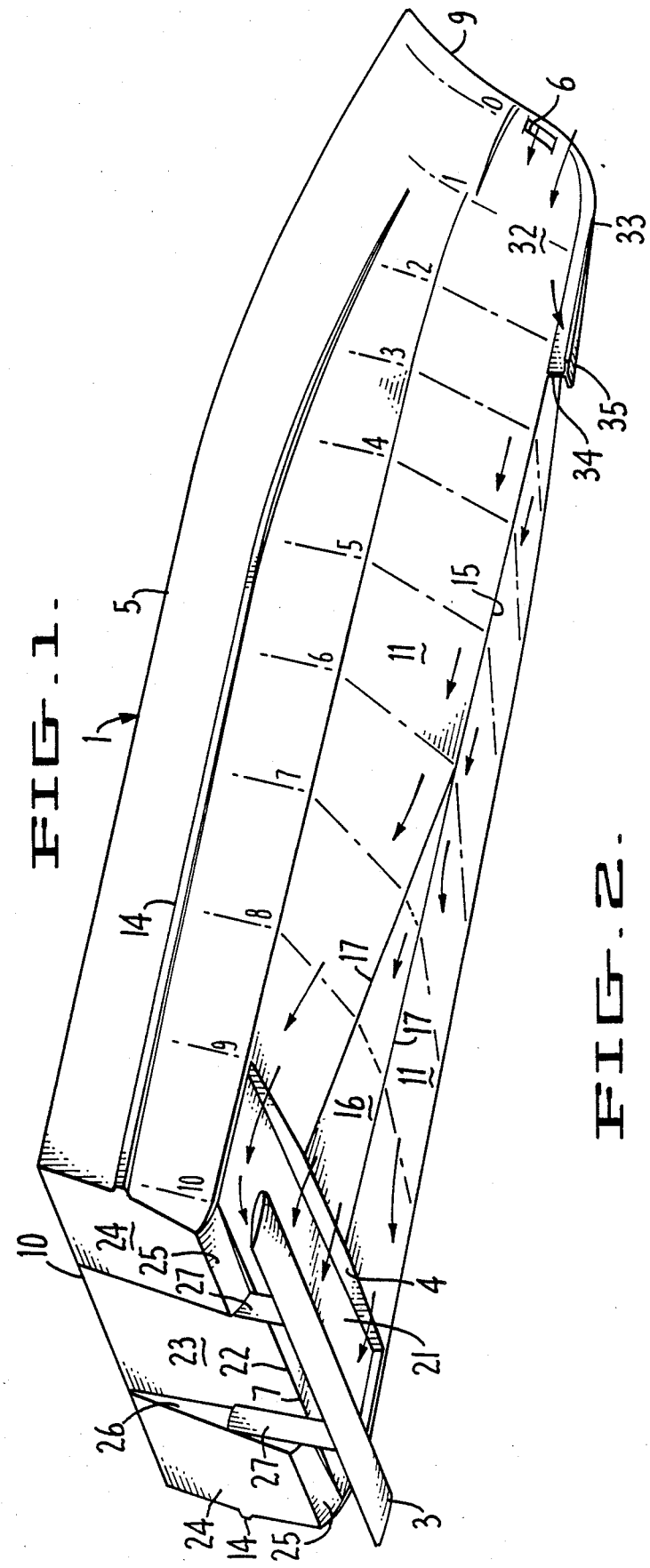

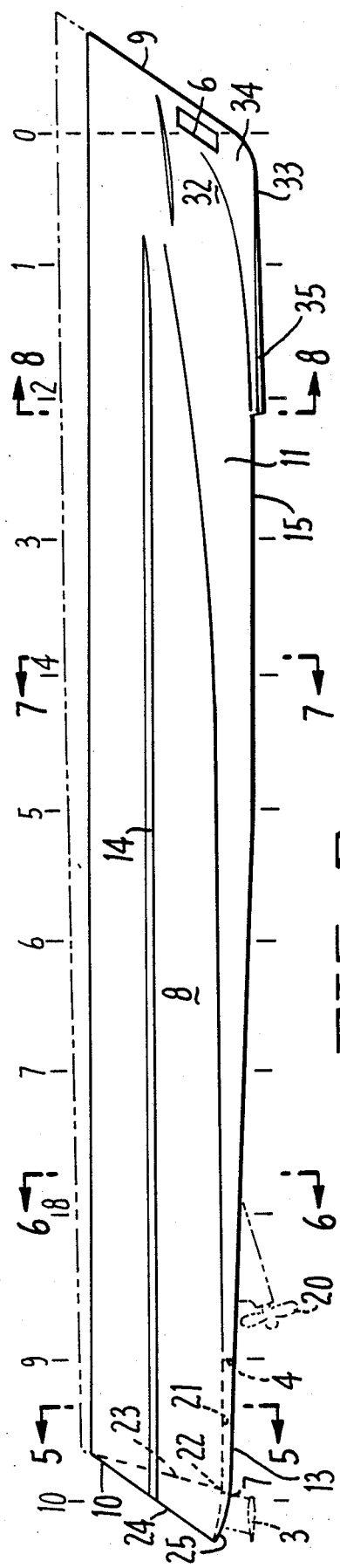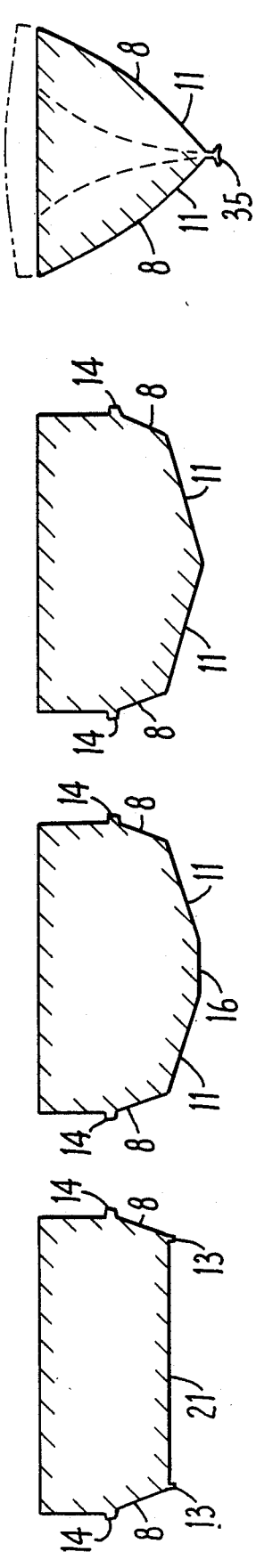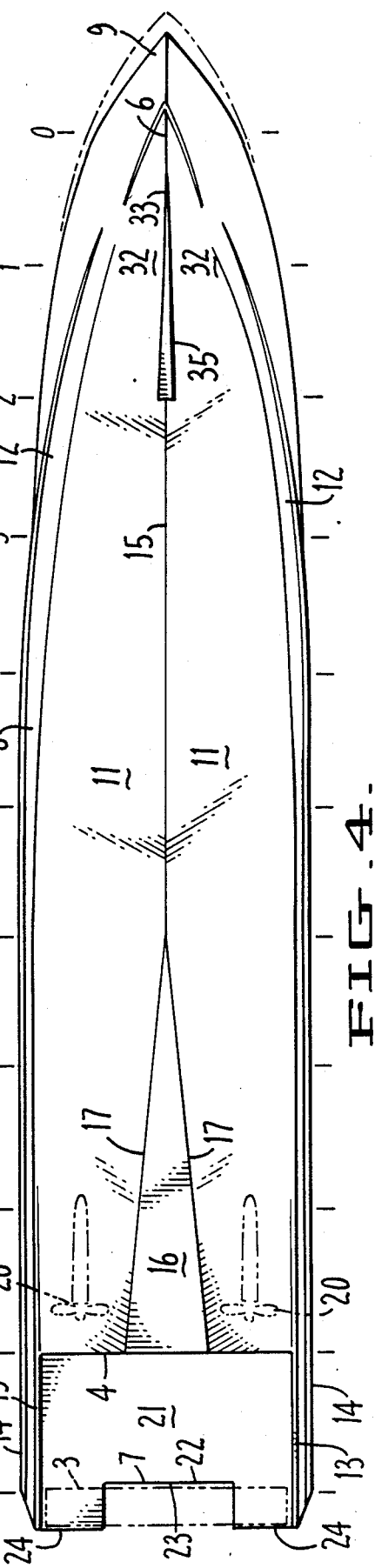

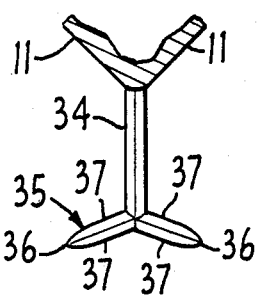
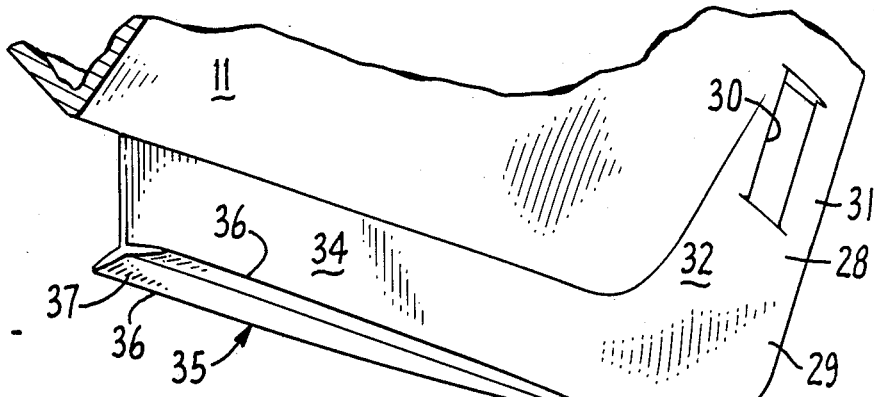
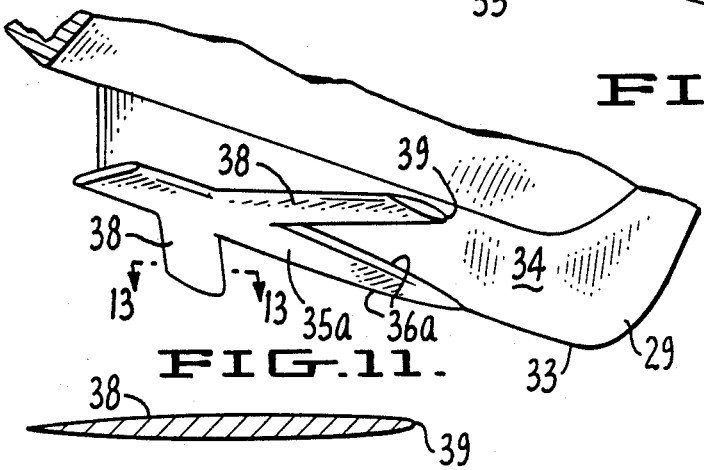
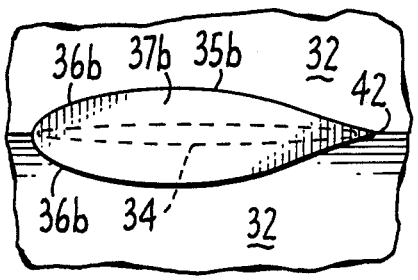
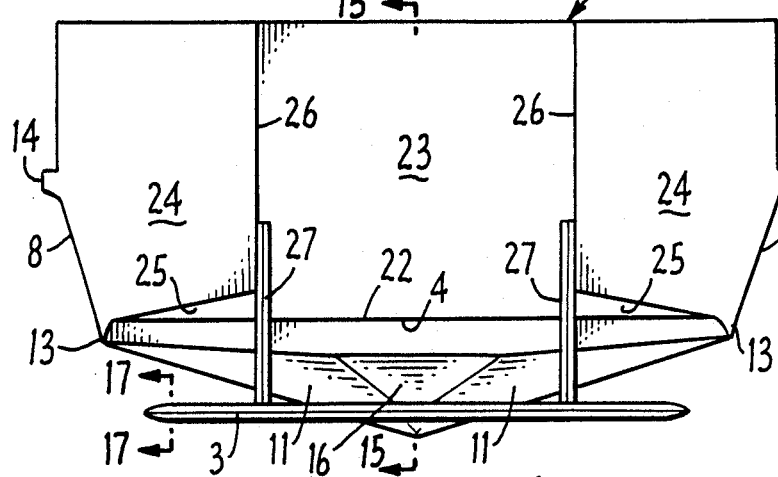
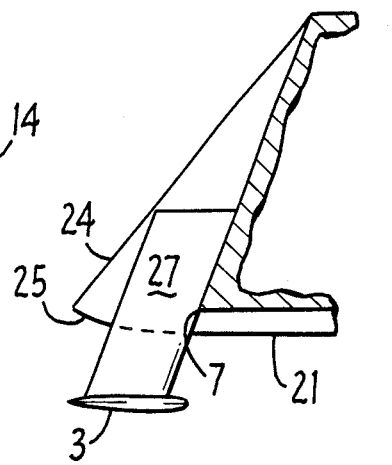
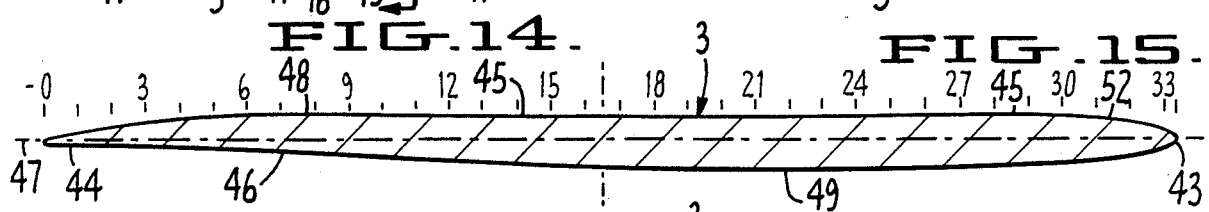
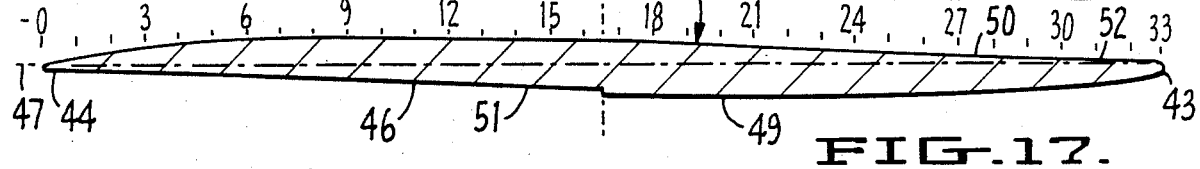

VESSEL WITH IMPROVED HYDRODYNAMIC PERFORMANCE

RELATED APPLICATIONS

This is a continuation-in-part of U.S. application Ser. No. 07/043,677, filed Apr. 28, 1987 now abandoned.

BACKGROUND OF THE INVENTION

This invention relates to navigable vessels and one of its principal objects is to provide a vessel with improved performance, particularly a vessel that creates less turbulence, has less frictional resistance, and performs better in disturbed water and heavy seas, while maintaining stability and operating capability. The result of such improvements is increased fuel economy and/or speed, smoother operation, less structural demands on the vessel and improved operation in disturbed water.

A vessel moving through water experiences frictional resistance at the wetted surface below the water line. As the speed of the vessel increases the turbulence created by the hull moving through the water increases rapidly until frictional forces become the practical barrier to higher speed. The energy required to propel the vessel increases correspondingly. Improving speed and efficiency are recognized as the primary goals and activities in the naval arts and decreasing frictional resistance is seen as the key to these goals. An additional goal has been to improve the ability to operate in disturbed water, including heavy seas, where pitching and slamming, spray, yaw and roll severely limit navigability.

Another important factor in addition to speed that influences the efficiency of the vessel is its ability to maintain trim. Trim is the attitude at which the vessel is designed to lie when at rest. For displacement vessels this will usually be the same attitude that the vessel assumes at speed. It is important both for convenience and practicality that the decks, working, areas, equipment, etc. be at the same relationship to the horizontal (i.e. be horizontal) both when the vessel is at rest and when underway.

However, planing vessels normally are designed to (and must) operate at a positive trim angle, usually two to ten degrees, so that the stern remains in the water enough to maintain the stability of the vessel, not only against roll and yaw but also against pitching forces that could take the bow under, and to keep the propelling mechanisms submerged. (Loss of trim is usually measured as an angular deviation of the vessel's horizontal center for gravity line from true horizontal, zero degrees being perfect trim.) Such deviation from trim imposes a substantial penalty of increased friction and drag due to sinking of the stern, increased pitching, slamming and yaw, wind action against and air entrainment under the upraised bow and a substantial spray root at the bow entrance, as well as a decrease in the efficiency of the propelling system in most cases. Thus, maintaining trim is an additional objective in the art to further the primary goal of improving speed and efficiency.

BACKGROUND ART

Numerous vessel designs have been proposed for reducing resistance. Planing hulls are widely used in moderate size and smaller vessels. The planing surfaces on the hull cause the vessel to rise in the water as speed increases, thus decreasing the wetted surface area and thereby decreasing the frictional resistance and drag. This decrease can be substantial. Nevertheless, a substantial amount of the wetted surface remains, together with its associated frictional resistance and drag, and the trim limitations impose the substantial penalties on efficiency mentioned above. Aside from the efficiency problems associated with trim, as speed increases water flow past even the most streamlined planing surfaces becomes turbulent. This turbulence has been yet another barrier to increased speed and efficiency for which a solution has long been sought.

Hydrofoils, like airfoils (e.g. wings) in the aeronautical arts, are streamlined bodies which create a useful reaction ("lifting force") from a fluid stream moving relative to them. In practice hydrofoils are given a different curvature (camber) at the opposed surfaces. The resulting unbalanced profile is designed to create an efficient lifting force in the water at the selected angle of attack of the hydrofoil, i.e. the angle between the chord (straight line connecting the leading and trailing edge) of the hydrofoil and the direction of movement of the vessel. The hydrofoils are secured to the hull of the vessel and usually extend transversely amidships, at and/or below the bottom of the hull.

Hydrofoils are capable of lifting the vessel almost completely from the water, thus reducing friction and drag to that imparted by the remaining relatively minor amount of wetted surface (principal portions of the propulsion system, and the relatively hydrodynamically efficient rudder and hydrofoils). However, the formidable structural and other design problems involved in lifting an entire vessel onto hydrofoils and continuing to propel it limits their use to smaller vessels. These vessels have additional serious shortcomings. They have poor stability and are difficult to handle. They have limited service speed. Hydrofoils are highly vulnerable to floating debris. Moreover, hydrofoils, as designed and positioned, can only impart a lifting action and they serve no appreciable function of heave or trim control, of countering yaw or pitch or of decreasing the friction or turbulence of the water on the vessel hull when a portion of the hull is under water at slower speeds. Indeed, the foils likely add to turbulence and drag when the hull is in the water.

Hull design efforts have been directed at the use of dynamic forces created as a planing vessel moves through the water to reduce settling or sinking of the stern due to upward inclination of the bow during planing. In particular, foils have been suggested for imparting a lifting force on a vessel to affect its trim. In U.S. Pat. No. 4,569,302 a lifting foil is attached to the stern skegs of a barge, and in this position would tend to lift the stern. This could compensate for the uplift of the bow of the barge by a tow line and thus help to maintain trim. In British patent specification No. 2,082,125 a hydrofoil is employed at the stern of a catamaran or other multi-hulled vessel to provide a hydrodynamic lift to modify the longitudinal trim angle of the craft.

*Hydrodynamics of Ship Design*, a three volume treatise by Harold E. Sauders, published by The Society of Naval Architects and Marine Engineers, 74 Trinity Place, New York 6, N.Y., 1957 (referenced hereafter in this background as "*Hydrodynamics*") reports, at Vol. 1 pages 428–431 and 563-4 on expedients for trimming a vessel by lifting the stern. These include angled propellers that lift the tern, lifting planes in the propeller wash, downward spray deflectors at the stern which impart an upward force by deflecting spray from the propellers, wide stern waterplanes and stabilizers or submerged stern hydrofoils that similarly impart upward force to bring a planing craft into a more nearly horizontal running attitude. Another proposal, in U.S. Pat. No. 3,138,130, is to channel the bow wake through a central cavity throat to the stern of the vessel, thereby generating upward force. However, to the extent any of these expedients succeed in imparting upward force (lift) that raises the stern to improve trim, they create the offsetting problem of reduced stability and control.

Diving planes or foils utilized both at the bow and the stern of submarines. By adjusting the angle of attack, these planes will create an upward or downward force at the bow and stern, as the submarine moves in water, to change the attitude of the vessel from the horizontal to dive or rise to the surface (see *Hydrodynamics* Vol. I, p. 569). However, these foils are maintained in a neutral or no lift position for surface travel. In German Pat. No. 399,710 unbalanced foils are mounted at the sides of a hull perpendicular to the longitudinal axis of the hull. The foils are pivotable to create upward or downward forces to counteract pitching of the vessel or to otherwise alter the longitudinal trim of the vessel such as to cause the vessel to dive or rise in the case of a submarine. Here, again, such forces are utilized solely for longitudinal trim of the vessel and are not intended to effect the overall heave or displacement of the vessel.

Downward and lateral forces have been imposed on sailing vessels, by means of foils under the hull, for the purpose of countering yawing and heeling forces on the vessel, as described in U.S. Pat. Nos. 4,193,366 and 4,058,076. Although this was not recognized, the downward force may also have some affect in maintaining longitudinal trim of the vessel, in the sense of dampening pitching forces created by the water and the wind. However, the amount of downward force that can be imposed and amount of benefit derived would be quite limited. A downward force of a substantial magnitude on a displacement vessel would heave it substantially below design trim and thus both detract from design efficiency and create the danger of foundering. Additionally, unlike a planing vessel, the hull of a displacement vessel normally retains its trim and stability at speed so the additional force imparted would be of limited benefit, particularly as compared with the additional friction and drag created.

Hydrofoils have been suggested for producing a downward force longitudinally on a boat to counteract pitching of the vessel or to increase the trim angle. In the case of U.S. Pat. No. 3,225,727 an articulating foils is positioned in the water below behing the center of bouyancy (e.g., below the tail) of an amphibious aircraft. The foil is activated to impart a downward force to hold the stern down, thus preventing dipping of the bow. The objective of this downforce is solely to counteract forward pitching and there is little or no effect on the overall displacement or heave of the craft and no effect otherwise on the running characteristics or mode of the craft. In British Pat. No. 700,771 a sailing craft is provided with an upward lifting foil secured to a boom forward of the bow and a downward force foil secured to a boom aft of the stern. The foils act to together to cause a torque longitudinally to raise the bow and depress the stern to counteract the opposite torque caused by wind forces on the sails. The desired effect is solely to increase the trim angle of the vessel and there is little or no effect on the overall displacement or heave of the vessel and no effect otherwise on the running characteristics or mode of the vessel. This is the case, as well with respect to U.S. Pat. No. 3,391,667 in which trim tabs are provided at the stern of a full planing power boat to adjust the trim angle of the vessel by selectively imposing an upward or downward force at the stern. Upon application of the downforce, the stern is lowered and the bow raised. Thus, here again the effect of the downforce is simply to increase the trim angle.

Higher speed displacement vessels such as destroyers, cruisers, battleships and other military craft, are provided with sharp or "fine" and deep draft bow sections, usually with concave to straight buttocks at the entrance and a full forefoot (junction of the stem and the keel). The profiles of these and similar bow sections are illustrated in *Hydrodynamics* at Section 26.10 (pp. 394–5 of Vol. 1). Such low volume and thus low buoyancy entrances are highly efficient but their surface configuration tends to generate suction at the buttocks and bottom thus imparting substantial negative lift to the bow. Due to the limited buoyancy and lack of surface to generate compensating upward force, this entrance design can impart a degree of instability that can endanger a vessel. However, with displacement vessels of this design fore-to-aft stability against pitch and yaw is not a major problem both because of their normally lower speed compared to a planing vessel and because of the stability provided by their much greater wetted surface supported by buoyancy throughout their length. However, for the stability problems indicated, it is customary to drastically cut away the forefoot of a planing vessel so that the bow wave comes under the hull to lessen yaw and pitch that can cause the bow to dig in and capsize the vessel (see Section 30.4 of *Hydrodynamics*, p. 426, of Vol. I).

As indicated at Sections 77.15 and 77.16 (pp. 835–7 of Vol. 2) of *Hydrodynamics*, bows having a high rise of floor forward (i.e. a narrower or finer bow) and concave to straight buttocks at the entrance have been suggested for planing vessels. However, the limitations of this design for navigation in disturbed water in regard to pitch and yaw are acknowledged. Moreover, the suggested bow designs are actually relatively broad at the entrance and relatively shallow (i.e. short in the vertical direction below the waterline). This is consistent with the widely held view that a planing vessel must carefully avoid generation of forces that would cause the vessel to "trim to the stern" (assume a negative trim angle) and thus create the danger of the bow digging into disturbed water and possibly capsizing. For this reason planing vessels are conventionally provided with substantial volume and lateral surface at the bow for buoyancy and upward planing force.

Pitching, yawing, slamming and spray resulting from sea action has been a further hinderance to vessel performance, creating severe friction and turbulence and hindering control of the vessel. Various means to counteract this affect of sea action have been proposed. The previously mentioned upward and downward force foils will have some effect in countering pitch but for the most part they do so by undesirably increasing the trim angle of the vessel, thereby lowering its efficiency, and stability of the vessel. Moreover, such approaches add no further appreciable contribution to the running mode or characteristics of the vessel.

Hydrofoil vessels are usually provided with one or more upward lifting foils mounted at the bow upon which the bow rises to a planing position above the water, as, for example, described in U.S. Pat. No.

2,597,048. These foils usually extend transversely a substantial distance in order to provide lateral stability to the vessel, particularly for turning movements, connection with a hydrofoil vessel described in U.S. Pat. No. 4,237,810 a forward hydrofoil is mounted on a streamlined post below the bow and the post is provided with ridges spaced above the hydrofoil to act as small foils to provide additional lift to aid the principal hydrofoil in lifting the bow and maintaining it at the hydroplaning attitude above the water. However, the ridges, like the principal hydrofoil, do not interact with the hull surfaces except to cooperate in lift the vessel completely from the water to hydroplaning attitude.

Modifications of the bow section of a vessel below its waterline have also been suggested to decrease wave pounding on the hull bottom due to pitching of the vessel in heavy seas, such as the torpedo-like body below the keel line disclosed in U.S. Pat. No. 3,885,514. However, such modifications as these result in considerably increased friction and drag on the vessel and their design is inefficient for effectively dampening pitch of the vessel.

Skegs, which are projections or appendages on the underwater hull, have long been employed at the afterbody of vessels for various purposes including dampening of swings to thus impart stability of route *Hydrodynamics* at Section 25.15 (pp. 379) also suggest that "a skeg may be applied to or worked into the entrance---", although the type of vessel and particular purpose in mind is not revealed. So far as is known the employment of skegs at the forebody of a planing vessel, and in particular a planing vessel designed to operate close to or at trim, has not previously been addressed.

In conventional planing hulls the draft at the stern is quite substantial, frequently approaching or equal to draft at midships, and this design is thought necessary in order to provide adequate stability to the vessel during planing. It has been proposed, British Pat. No. 700,771, to provide a bouyant extension at the stern of a hull with planing surfaces which is hinged to the stern to rotate around a transverse axis and having a flat undersurface to enable the water displaced at the aft end of the hull to proceed up a gently incline back to water level. This expedient may tend to decrease the drag at the stern to some extent. However, the extension will, itself, create additional friction in the water and it does not provide substantial lift contribution to the vessel.

Steps on the planing surfaces of a planing vessel have long been known in the art. A step is a vertical discontinuity, usually sharp, across the bottom of the vessel. Typically they are straight or V-shaped in plan form. However, owing to the greater complexities arising from incorporating steps into vessel design and uncertainties as to the effect they will have in a particular design, practically all vessels other than racing craft, now have stepless hulls.

SUMMARY OF THE INVENTION

This invention relates to improving the performance capability of planing vessels, both as to efficiency and speed and as to their stability and operating ability, particularly in disturbed water, and methods of operating vessels to achieve improved performance. In accordance with this invention planing vessel performance may be substantially improved by imposing on the vessel during its movement a dynamic downward force which is generally aligned with the longitudinal vertical centerline plane, at a location or locations along the length of the vessel. Dynamic force is intended to mean force generated as the vessel moves through the water, as contrasted to static force, such as the gravitational forces caused by the weight of the vessel, cargo, ballast, etc., which severely impede efficiency during navigation and which can create difficulties in establishing and maintaining a satisfactory trim to the vessel both at rest and during navigation.

A further important aspect of this invention is that the dynamic downward force is positioned to counter the tendency of the planing surfaces to increase the trim angle and to heave the vessel into an unstable condition as speed increases and to counter forces creating yaw and pitch, thus generally improving the trim of the vessel during operation. By appropriate placement of the dynamic force, trim may be maintained during operation of the vessel which approaches or equals that of the vessel at rest particularly in the case of vessels specifically designed for the application of such force.

More specifically, the location and magnitude of the dynamic downward force and/or the other upward and downward forces acting fore-and-aft on the vessel, both static dynamic, are adjusted relative to each other to bring the locus of all such upward forces and the locus of all such downward forces closer to each other and, ideally, to have such loci coincide at any given speed, particularly as speed increases from displacement mode to planing mode at around ten to twenty knots. In practice, this may include not only positioning of the point or points of application of the dynamic downward force but also vessel design to provide and position weight, buoyancy, planing and other lifting surfaces, propeller downward pull or suction at the buttocks and bottom, etc. which will cooperate most effectively with the dynamic downward force to maintain trim through the entire speed range of the vessel. Desirably the downward force applied is generally 1 to 50% or more preferably 5 to 25% of the displacement weight of the vessel.

Another aspect of this invention relates to configuration of the wetted surface in specific ways that cooperate in a unique fashion with the dynamic downward force of this invention and which, additionally may be beneficially used independently. These include a deep draft, fine bow, a bow skeg, a bow wing, a fore-and-aft planing surface and keel configuration, an aft flow separation zone and an aft chine separation fins and double stern arrangement.

The bow of this invention for planing vessel is both deep and fine, as compared to conventional planing vessel bows, and is generally flat to concave at the entrance. Desirably for vessels with a V-bottom planing surface, the bow entrance at points 10% and 20% of the distance from the fore perpendicular to the aft perpendicular have a ratio of the design chine beam to keel line draft no greater than 3 and 4, respectively. Similarly, the mean draft over the distance from the fore perpendicular to points 10% and 20% of the distance to the aft perpendicular is desirably at least 80% of the deepest draft aft of the entrance and may be equal to or greater than the aftward draft.

Unlike conventional planing vessel bows, the entrance of this invention generates only limited lifting force due its shape. Instead, that shape will generate predominating suction forces as vessel speed increases, which will bias the bow downward, thus preventing the bow from "planing up" to a positive trim angle as do conventional planing vessel bows. This downward force will cooperate with a dynamic downward force applied aftwardly of the pressure point of the vessel planing surfaces to facilitate the dynamic trim of this invention. The downward forces at the entrance and aft will together "balance" the vessel to trim about the "fulcrum" of upward planing force acting therebetween. The aftwardly dynamic force, additionally, has a biasing effect against downward pitching at the bow, again acting through the "fulcrum" of the upward planing force acting in between, thus imparting stability for a bow that could otherwise be dangerous in disturbed waters when operating at zero trim.

Another feature of the invention comprises a vessel equipped with a forward skeg and a forward wing for purposes which will be described. Both the skeg and the wing are located forward of midships, preferably extending aft from the bow, centered on the longitudinal centerline of the vessel. The skeg is attached to and extends downwardly from the bottom of the vessel along the hull line. As compared to conventional aftward skegs, the bow skeg's positioning will be more effective in maintaining the vessel in its path of travel (directional stability) and in decreasing yaw in heavy seas. Utilized in this invention in which the vessel may operate at zero trim, the forward skeg carries out the important function of splitting the oncoming flow which better distributes and partially relieves the pressure of the flow on the aftward wetted surface, thus helping to retain laminarity of the flow and thereby reducing turbulence and friction. This is a unique function which would have little or no affect with prior art planing vessels which plane up at the bow to essentially "ride" on top of the water.

Advantageously, the forward wing may be attached to the underside margin of the forward skeg and supported thereby. The forward wing, in general aspect is designed to have a streamlined and low resistance profile in the vessel direction and a relatively high friction and drag profile in the heave (vertical) direction. It is thereby capable of providing a lifting force and dampening pitch dynamically with minimum added friction and drag, particularly as compared to static dampeners such as ballast tanks. Advantageously, a swept back or "delta" wing is employed extending at the entrance aftward from its leading vertex five to 30% of the waterline length of the vessel along the skeg. This wing desirably has an angle between the leading surface to either side of 1 to 15 degrees.

Advantageously, when appropriately designed and positioned relative to the water flow, the wing may also be utilized to provide a dynamic lifting or depressive force on the vessel for foreward of midships for purposes of adjusting heave or trim of the vessel, either independently of or in cooperation with the other features of this invention involving trim and heave control.

Another feature of the invention is the design of the planing floor aft midships to enhance stability of the vessel for operation at zero trim. Conventional planing vessels which are "trimmed at the stern" i.e. operated at a substantial trim angle, are designed to have a draft aft midships of a similar magnitude as that at midships, and frequently even a greater draft. Contrary to this practice, in this invention the floor rises from midships to the stern at least 25% of midships draft and may rise as much as 50% to 100% or greater of midships draft.

Yet another feature of the invention is a design for a vessel trimmed in accordance with this invention which will minimize the drag normally experienced at the stern of planing vessels. A pressure release zone or floor is provided on the hull wetted surface at the tern extending to the transom, configured and positioned to gradually reduce the pressure on the flow along the hull planing surface without itself at the same time creating undue additional turbulence and friction. The pressure release floor constitutes a planar or concave, upwardly extending terminal portion of the planing surface on the hull bottom which intersects aftwardly with the stern to form a transverse trailing edge. The pressure release floor, fore-to-aft, desirably extends between 5% and 25% of the waterline length of the vessel and rises between 10% to 50% of midships draft of the vessel. A transverse step may be positioned aftmidships near and advantageously may form the leading portion or edge of the release zone to enhance its effect. The trailing edge of the pressure release floor is straight, extends across the stern parallel with the base line plane and perpendicular to the vertical longitudinal centerline plane of the vessel, is elevated from the step and is positioned approximately at the design waterline of the vessel, desirable a distance of less than 15% of midships draft above or below the design waterline.

Another aspect of the invention is the provision of a double stern construction having a rearward and upward fin extension of the chine at each side of the vessel which effects a smooth and gradual flow separation at their aft termination, thus avoiding drag that otherwise occurs.

By utilizing the principal of this invention vessels may possess larger planing surface and have a broader beam and a larger stern section without problems of stability (particularly as to pitch and roll) and control or an unacceptable increase in friction and drag, thereby permitting larger payloads and improved performance. Thus, another aspect of this invention are vessels having a planing surface configuration which would be unstable for conventional planing vessels and vessels having a planing surface configuration which is unique with respect to amount of such surface and/or its distribution on the vessel's hull.

An important aspect of this invention is the employment of foils under or beside the hull at a position or positions along the hull to create the appropriate dynamic downward force. The foils are disposed with their leading edges in the vessel travel direction and are oriented to present an angle of attack to the water flow to generate the desired downward force at the vessel speed. Conventional foils, either with a symmetrical profile or dominant camber on the lift direction side, may be employed. However, special foils particularly adapted for this use are provided to optimize the benefits the invention and comprises another feature thereof.

The conventional foils referred to above have a characteristic little considered nor of any moment in their conventional use, namely they divert flow, as it passes the trailing edge, in the direction opposite that of the lifting force imparted. However, as they are used in the present invention "upside down" to create a downward force, i.e. negative lift, such conventional foils will divert flow upwardly.

This can create turbulence alongside the vessel hull and at the stern, thus limiting to some degree the benefits otherwise available from the use of this invention. This drawback is avoided by use of a foil which is cambered in the leading section to exert a force downwardly but which is also specially configured in the trailing section so as to divert flow, at the trailing edge, in the same direction as that of the force imparted by the foil. A foil having an upper surface at the trailing portion that is convexely curved downward to the trailing edge. The downward flow which results from this design also will have the effect of neutralizing to some extent the pressure on the flow at the trailing edge, further reducing drag.

Novel foils having low induced drag, particularly at higher speeds, are also provided which have a lower surface from the midsection of the foil to the trailing edge which is curved upwardly a substantial distance toward the chord of the foil. For very high speed applications the foil is providing a relatively flat upper surface extending from the region of the leading edge toward the midpoint if the foil. To provide a force that is non-linear with speed, a step may be provided in either the upper or lower surface extending in the span direction, on the upper surface to decrease the rise in force at higher speeds and on the lower surface to increase the rise of force.

It will be seen that when implemented to the fullest, this invention appears to convert a planing vessel partially into a displacement vessel, in the sense that in planing the decrease in wetted surface is significantly less than, and proportionally perhaps only a small fraction of the decrease in wetted surface in a conventional planing vessel. This appears an anomaly and contrary to the very purpose of planing surfaces, i.e. to decrease wetted surface to the extent practicable. However, it has been discovered that in practice of this invention, the efficiency of the vessel is improved over conventional planing vessels and this improvement is even significantly greater than might be expected by the increased performance due to maintenance of at rest trim and consequent lower friction and drag at the stern and along the planing surfaces. Without intending to be bound by any particular theory as to these results, it is postulated that at zero trim angle, the narrow, deep bow surface coast with the gradually flaring planing surfaces extending aftwardly to smoothly guide the flow principally in a fore-to-aft flow line in a manner that minimizes turbulence and, in particular, avoids entrapment or entrainment of air bubbles under the hull and greatly supress and, perhaps, completely eliminates the spray root or roots that normally occur in conventional planing vessels. At the aft section the gradual and uniform release of pressure due to the arrangement of planing surfaces described additionally minimize the friction and drag usually experienced at the stern.

BRIEF DESCRIPTION OF THE DRAWINGS

FIG. 1 is a plan view in outline form of a vessel with a superimposed force diagram to demonstrate the action of forces longitudinally on a vessel, as they relate to the present invention.

FIG. 2 is an isometric view of a vessel embodying the present invention taken from the starboard side.

FIG. 3 is an elevational view of the vessel of FIG. 2 taken from the starboard side.

FIG. 4 is a bottom view of the vessel of FIG. 2.

FIG. 5 is a cross-sectional view at the aft section of the vessel of FIG. 3 taken aftwardly along lines 5—5.

FIG. 6 is a cross-sectional view at the aft section of the vessel of FIG. 3 taken aftwardly along lines 6—6.

FIG. 7 is a cross-sectional view at the fore section of the vessel of FIG. 3 taken aftwardly along lines 7—7.

FIG. 8 is a cross-sectional view at the fore section of the vessel of FIG. 3 taken forewardly along lines 8—8, And, in dotted line, a cross-sectional view of the fore section forewardly of lines 8—8 at station ½ (half way between stations 1 and 2 marked along the length of the vessel in FIG. 3).

FIG. 9 is an isometric view of the bow forward of section lines 8—8 of FIGS. 1-3 taken from below and showing the skeg and forward wing mounted along the bottom thereof.

FIG. 10 is an enlarged fragmentary view of the lower portion of cross-sectional view of FIG. 8.

FIG. 11 is the isometric view of FIG. 9 but showing an alternate form of a forward wing on the bow.

FIG. 12 is a fragmentary view of the bow of FIG. 2 but showing an alternative form of the forward wing mounted thereon.

FIG. 13 is an enlarged cross-sectional view taken along lines 13—13 of FIG. 11 showing the cross-sectional of the forward wing.

FIG. 14 is a stern view of the vessel of FIGS. 2-3.

FIG. 15 is a fragmentary cross-sectional view taken outwardly along lines 15—15 of the stern of FIG. 14 showing a foil and its connection with the vessel.

FIG. 16 is an enlarged cross-sectional view taken along lines 16—16 of FIG. 15 showing the foil in cross-section.

FIG. 17 is an enlarged cross-sectional view showing, in cross-section, an alternative foil configuration forming a part of this invention.

SPECIFIC DESCRIPTION OF THE INVENTION

Figure 18:
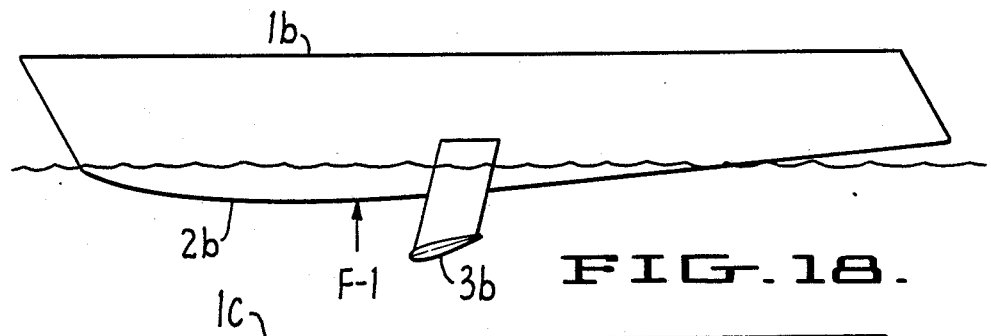
FIG. 18 is a plan view in outline form of a vessel showing the planing surface configuration thereof and the related positioning of downward force generating means.

Planing vessels contemplated in the practice of this invention are vessels for which at design speed dynamic lift is appreciable, equaling at least five percent of the weight of the vessel and, when operated conventionally, which have their center of gravity at least as high as it is with the vessel at rest. This includes so-called semi-planing vessels which generate a lifting force smaller in relation to displacement weight, on the order of ten or, perhaps more typically twenty or forty percent of the displacement weight, and full planing vessels for which dynamic lift at speed may equal one half to two thirds of the weight or as high as ninety percent. Operated conventionally, a full planing vessel at design speed will have a center of gravity higher than at rest and a wetted surface which is may only one third of the at rest value, or even less. It should be understood that benefits of this invention may be realized for semi-planing vessels which may be as great as for vessels with greater planing force potential relative to vessel weight.

A clearer understanding of this invention may be obtained by first illustrating the forces normally acting upon a planing vessel during movement and then describing the interaction of the forces applied in accordance with this invention. FIG. 1 shows the nature and directionality of the various forces acting upon a planing vessel 1a. These include the weight W. of the vessel and its contents, acting through the center of gravity, and the upward buoyancy force B. of the water on the wetted surface of the vessel, acting collectively through the center of buoyancy. The centers of gravity and buoyancy normally coincide when the vessel is at rest.

When the vessel is at speed, planing force P. F. will act upwardly along the planing surfaces 2a and, collectively, this force will act through a locus called the pressure point. Also, in the case of conventional planing vessels in the planing mode, the vessel will rise in the water (heave up) until the planing force is counterbalanced by the loss of buoyancy force due to the loss in wetted surface (or lowering of the waterline) due to the rise. Typically, a conventional planing vessel will rise until the wetted surface decreases to one third or less of the at rest wetted surface (when all of the vessel's weight is borne by the buoyancy of the vessel). Hence, buoyancy force is decreased in the planing mode with the substitution of planing force. The locus of these planing forces, as well as their magnitude, can be adjusted fore-and-aft by distributing more or less surface fore or aft, by changing the inclination or angle of attack of such surfaces longitudinally and/or, in the case of V-bottom vessels, by changing their transverse inclination (called "raising or lowering the floor").

To a varying extent depending upon the vessel's design, other forces will act fore and aft to influence both trim and heave. An important force is the downward force of suction caused by negative differential pressure (negative lift) D. P. generated along the bottom and sides of the vessel below the waterline (buttocks) by flow along these surfaces. Generally the more wetted surface, particularly in the vertical direction, the more negative lift from downward suction at the bottom and buttocks. Too much negative lift from foreward surfaces may cause the vessel to incline toward the bow, i.e. assume a negative trim angle. A vessel in this condition, called "trimmed at the bow" is susceptible to submergence at the bow and capsizing.

The trim of the vessel in the planing mode will vary in accordance with the relative distribution, fore-to-aft, of the various forces, particularly the dynamic forces which may vary with the speed of the vessel. For example, by changing the configuration of the planing forces to create relatively more planing force at the foreward section (forebody) of the vessel, in the planing mode the increased forward force will raise or heave the bow relative to the stern and thus increase the trim angle of the vessel. Increasing the fineness and vertical wetted surface at the bow (deepness) will increase the suction forces along these surfaces and the negative lift created thereby and thus lower the bow relative to the stern.

In accordance with this invention additional forces fore-to-aft are superimposed on the vessel for affecting trim and for other purposes to be discussed. These include the dynamic downward force N. L. (negative lift) supplied by a foil 3a shown at the stern of the vessel in FIG. 1 and the upward force L. (lift) of the forward wing 35a illustrated at the bow of that vessel. These forces may be adjusted fore-to-aft in accordance with this invention as will be described.

In designing planing vessels the essential considerations of directional stability, fore-and-aft stability and ability to cope with the roll, pitch, yaw and surge forces in disturbed water must be taken into account. As a consequence, the vessel forces are conventionally arranged so that at planing the vessel will "trim at the stern" typically between two and six degrees, to maintain stability in disturbed water against digging in of the bow and directional and transverse stability. As previously explained the result is a large penalty of friction and drag.

By contrast, in the practice of this invention the trim angle may be maintained less than two degrees, and, advantageously, zero degrees or even at a minor negative angle, such as up to minus five degrees, if desired for example to reduce pitching in heavy seas, while still maintaining vessel stability. Contrary to conventional practice, which is to elevate the vessel to the maximum by upward forces, in this invention downward force is applied to the vessel both to bring it closer to trim and to improve its stability. Appropriately designed, the vessel will be capable of operating in disturbed water with stability against bow submergence and directional and transverse stability. More conventional planing vessels may also benefit from use of this invention although in some cases to a lesser degree.

As it applies to all planing vessels, of special design or not, the dynamic downward force is applied strategically fore-to-aft along the longitudinal vertical centerline plane in relation to the other forces acting on the vessel, and particularly the planing forces, so as to bring the vessel closer to zero trim.

Figure 19:
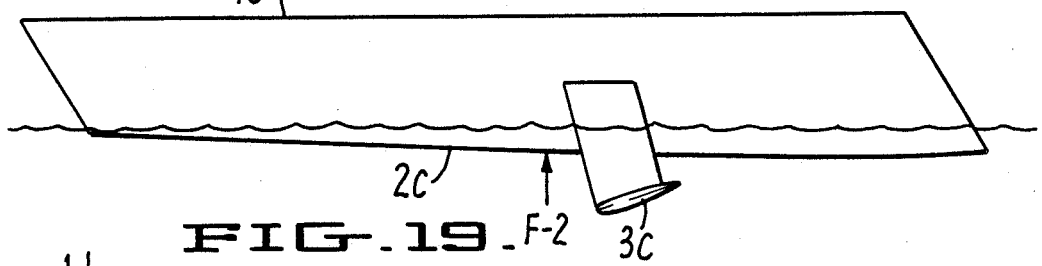
FIG. 19 is a plan view in outline form of a vessel showing another planing surface configuration and the related positioning of downward force generating means.

FIGS. 18 and 19 illustrate this principle, focusing only upon the upward planing forces of the vessel. In FIG. 18 the planing surfaces 2b at the forebody of vessel 1b, as shown in trim, have a pronounced convexity thus presenting to the oncoming flow a substantial rise at the bow which will generate strong planing forces forward and only lesser forces aftward of the convexity. Thus, the locus of planing forces will be foreward such as at F-1. To balance these forces to maintain trim, a dynamic downward force, preferably generated by a foil 3b, is positioned more forward, as shown, at or slightly forward of midships. In contrast, the planing surface 2c of vessel 1c in FIG. 19 has a much less pronounced convexity and a smaller rise at the bow so the locus of planing forces will be more aft such as at F-2. Accordingly the downward force, generated by foil 3c, is positioned more aft, i.e. somewhat aft of midships.

Figure 20:
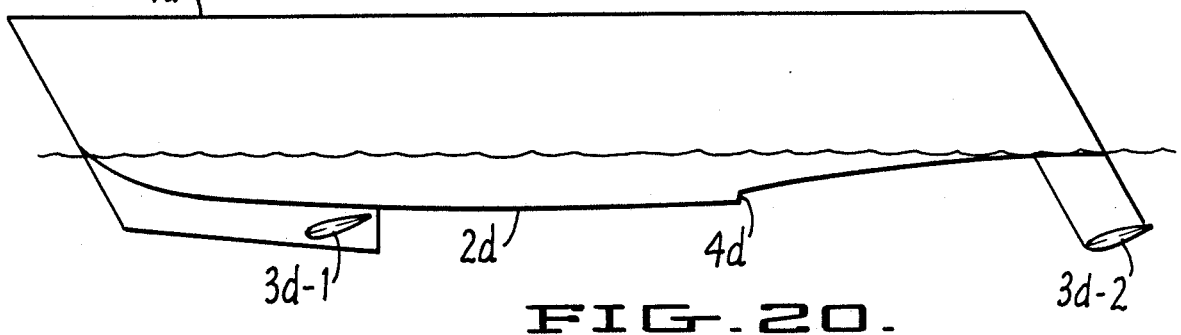
FIG. 20 is a plan view in outline form of a vessel showing another planing surface configuration and the related positioning of downward force generating means.

A more complex balance is illustrated in FIG. 20, again focusing only on the planing forces. Vessel 1d has a forward planing surface 2d resembling that of FIG. 18, which will generate a planing force having a locus or pressure point more forward, as well as a step cooperating with a stern pressure release zone (fully explained at a later point) which will also tend to concentrate planing force forwardly of step 4d. To balance the upward planing forces in order to maintain trim as planing, the downward dynamic forces may be divided into two components, a forward component generated by foil 3d-1 fore midships and a aft component generated by a foil 3d-2 located at the stern. The force and exact location of each component may be regulated relative to each other and, collectively, relative to the planing and other forces acting on the vessel, in order to maintain trim and stability during planing.

The magnitude of downward force to be applied will vary primarily with the weight, volume (buoyancy) and wetted surface of the vessel and the amount of planing force the vessel generates at planing speed. In accordance with this invention it is desirable, at planing speed, to maintain the actual decrease in wetted surface at less than two thirds of the decrease (from the amount of wetted surface at rest) the vessel would experience without the downward force. Stability and trim should continue to improve with greater downward force that will maintain the wetted surface increase at less then fifty percent and preferably at a level of between five and twenty five per cent of the normal reduction of wetted surface (when the force is not applied). If desired, enough downward force can be applied to increase the wetted surface even as high as 150% or 175% beyond that at rest, which can be an advantage for vessels at high speeds or operating in heavy seas.

As a convenient guide for full planing vessels, the force may be related to the displacement weight of the vessel, i.e. the actual weight of the vessel out of water. Desirably, the downward force equals one to fifty percent or higher, and preferably between five and twenty five percent of the displacement weight. For semi-planing vessels the downward force would be generally less, desirably at least five percent of the displacement weight of the vessel and preferably between eight and twenty percent.

The forgoing general treatment of vessels with various configurations of planing surface, keel lines, etc. illustrates how employment of the dynamic downward force concept of this invention can be applied to conventional vessels to obtain its advantages to varying extents. However, for new vessels it may well be desirable to specifically design or "tailor" the craft to take full advantage thereof, particularly by incorporating one or more of the other features that form a part of this invention.

An example of a specially designed vessel is shown in FIGS. 2, 3 and 4 in which a single component of dynamic downward force is provided located at the stern to accrue special advantages of efficiency and structural design which will be described. Vessel 1 comprises a hull 5 having a fore perpendicular 6 at the bow, which demonstrates the point on the apex of the bow that is at waterline when loaded, in accordance with the vessel design, and an aft perpendicular 7 at the aftmost point where the stern meets the design waterline. The distance between these perpendicular constitutes the length of the vessel at waterline. The waterline length of the vessel in this example is 150 feet (30.5 m). For purposes of describing the hull, this distance is subdivided into ten equidistant stations as shown (including each perpendicular as a station) each equal to ten percent of the vessel length.

The sidewalls 8 of hull 5 extending above the waterline meet at the prow 9 and diverge aftwardly to a maximum width at about station 6. The sidewall continuing parallel to the stern 10. Each sidewall at its lower margin meets planing floor 11 at the bottom of the hull to form a chine line 12 which is desirably raised by providing it with a small projection or fin 13 (seen more clearly in FIGS. 14 and 22) to channel flow along planing floor 11. Projection 13 desirably is less than one foot (30.5 cm) in depth and preferably between one eighth inch (3 mm) and three inches (75 mm). Raised chine line 12 extends along the length of vessel 1 from approximately station 1 to the stern and, forward of about station 2, the raised chine line essentially serves as a spray strip to divert upward spray. A knuckle 14 above the waterline also extends along each of sidewall 8 from approximately station 1 to the stern.

Planing floor 11, which extends essentially the full waterline length of the vessel, is of generally V configuration with the apex at the keel line. As can be seen particularly from FIGS. 5 through 8, beginning with a very sharp V at forward perpendicular 6, the planing floor gradually flares outward until by station 6 it is a rise of floor angle of 15.25 degrees. The rise of floor angles at stations 7 through 9, respectively, are 13.5, 9.75 and 5.25. Aftwards to approximately station 6, keel line 15 has a design draft of 51.7 inches (132 cm) and is substantially horizontal, i.e. parallel to the base plane of the vessel, although it may be somewhat concave if desired.

From its apex at about station 6, a triangular and planar central floor 16 extends aftward at a slightly rising angle to the base plane of the vessel. Central floor 16, in the transverse direction, is approximately parallel to the vessel's base plane. The base plane of the vessel is the plane at the extreme draft of the vessel which is both perpendicular to the longitudinal vertical centerline plane and parallel to the design waterline of the vessel.

Desirably, the leading apex of central floor 16 is at or somewhat aft of the extreme draft of the vessel. Central floor 16 intersects and truncates the ridge line or apical portion of planing floor 11 thus forming two projection lines 17 diverging aftwardly. Both the V shaped floor 11 and central floor section 16 terminate at transverse step 4 at station 9 extending between chines 12. By appropriately adjusting the slopes of floor 11 and floor 16 relative to each other, floor 16 may be positioned so as to completely truncate floor 11 at transverse step 4, if desired, as shown at 16a in FIG. 22. At step 4 the draft of floor 11 is 11.8 inches (30 cm).

Thus, overall, floor configuration from midships in the longitudinal direction becomes generally flat and rises gradually to the stern, desirably by at least 25% of the draft at midships and, for improved stability for operation at zero trim, by at least 50% and preferably 75% of midships draft. In this example the rise to the stern from midships draft is 100% and it may be even somewhat greater (i.e. above waterline), if desired. From midships to the stern the rise of the floor longitudinally desirably is generally linear or somewhat concave and with the avoidance of a large degree of convexity. If convex, the aftmidships planing floor desirably has a mean draft transversely between chine lines at the transverse vertical plane half the distance between midships and the stern trailing edge no more than 50% greater than the draft at a linear projection between the point of greatest draft at midships (station 5) and the point of greatest draft at the stern trailing edge, and preferably is no more than 25% greater.

Transversely, from station 5 aftward, the chine beam for vessels of this invention advantageously may be relatively large and, desirably, as large or larger than that at midships. In the vessel of FIGS. 2-4, the chine beam at midships is 322 inches (818 cm) and from station 7 to the stern trailing edge, 341.4 inches (867 cm). In proportion to the waterline length of the vessel, the beam at the stern trailing edge is advantageously, in accordance with this invention, at a waterline length to beam ratio (L/B) of less than 6 and desirably less than 5.5.

Figure 22:
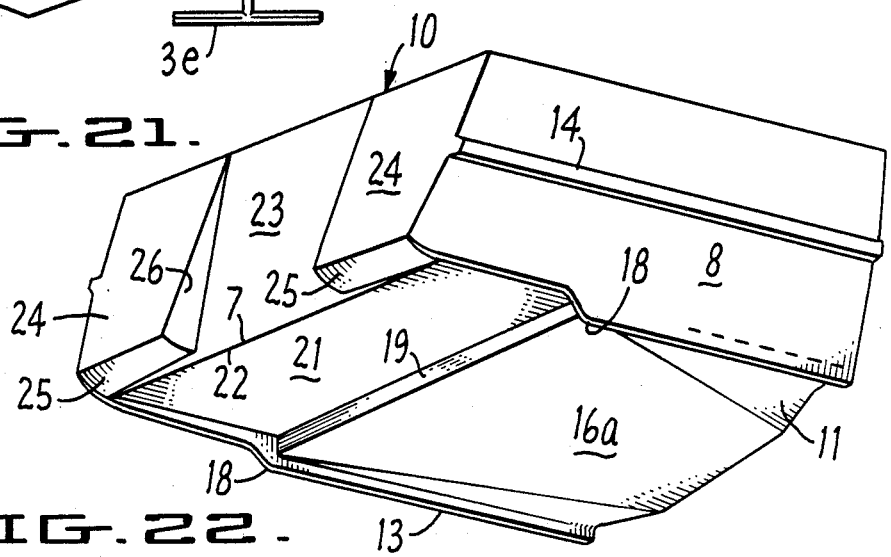
FIG. 22 is an enlarged isometric view, from below, of the stern of the vessel of FIGS. 2-4 (with the foil and struts not shown) but showing an alternative floor, step and chine fin configuration on the trailing portion of the vessel floor.

As best shown in FIG. 2, step 4 tapers linearly in height from its highest point at the longitudinal centerline line of the vessel toward each chine 12 to become flush with the fins 13. Alternatively, the step may horizontal from chine to chine as shown in FIG. 22 and, in this case, a bridging fin 18 is provided which is contoured to conduct across the step 19 the flow which moves aftwardly along the chines. The depth of the step (measured at the centerline), in this example 3.4 inches (8.6 cm), will be chosen with relation to the size of the vessel but can vary widely, desirably from 5 to 500 millimeters or, in proportion to the vessel, between 0.001 and 15% of the vessel's draft.

Propellers 20 are positioned bilaterally of the keel line immediately below planing floor 11, desirably at or within a distance equal to 50% of the chine beam in advance of step 4. With the propellers so positioned, the discharge therefrom will tend to "sweep off" eddy currents and turbulence that tends to form, at steps, particularly at slower speeds, thus improving the efficiency of the step. Additionally, the step will tend to remove turbulent flow from the propellers away from the aftward planing surfaces, thus further decreasing friction and turbulence normally associated with propellers under a planing vessel.

A pressure release floor 21 extends aftwardly of step 4. In the transverse direction pressure release floor 21 is perpendicular to the longitudinal vertical centerline plane and it extends either convexely or, as shown, as a flat plane to its highest point which is its terminus at trailing edge 22 located at the aft perpendicular 7. Trailing edge 22, which is parallel with the base plane and transverse to the longitudinal centerline plane of the vessel, constitutes the juncture of release floor 21 and transom wall 23. For maximum effect, the surface of pressure release floor 21 is at or above a plane extending between step 4 and trailing edge 22 and, intermediate the step and the trailing edge, such surface remains below the horizontal level of trailing edge 22.

The rise of release floor fore-to-aft is desirably equal to at least one tenth of the vessel's draft at midships and it may be as much as one half of the draft. The vertical location of trailing edge 22 should be a distance less than fifty percent, desirably less than twenty five percent of extreme draft of the vessel above or below the design waterline of the vessel and preferably within ten percent. Release floor 21 should extend fore-to-aft far enough to gradually and uniformly release the planing pressure imposed on the water prior to the step, thus markedly reducing the turbulence and drag usually experienced at the stern of a planing vessel. Desirably this is at least a distance horizontally of five to twenty percent of the waterline length of the vessel. In this example release floor extends fore-to-aft ten percent of the waterline length and rises from a draft of 15.4 inches (39.1 cm) to the 3.4 inches (8.6 cm) below the waterline, 23.2% of midships draft.

Twin stern counters 24 extend aftwardly of the aft perpendicular 7 at either side of the hull 5, each with a heel 25 extending aftwardly of transom wall 23 above trailing edge 22. Each heel 25 is slightly curved upwardly both aftward and in the inboard direction and is positioned slightly above the design waterline in order to provide additional fore-to-aft stability against pitching by its "push" against the water when the bow heaves.

The chine line fin 13 at either side extends aftward beyond trailing edge 22, curving upwardly along the margins of each heel to a point above the design waterline to smoothly separate at the stern the flow along the raised chine lines.

Inner walls 26 of each stern counter 24 is parallel to the longitudinal centerline and each connects with transom wall 23 to form an inboard notch for receiving mounting struts 27 for foil 3. Struts 27 may have pivot bearings (not shown) mounted in inner walls 26 of the stern counter 24 for pivoting around an axis which is horizontal to the base line plane and transverse to the vessel's longitudinal centerline. As shown in FIG. 16, struts 27 are foil shaped in transverse cross-section with equally cambered surfaces, with the chord generally parallel to the vessel's longitudinal direction. Struts 27 at their lower ends are attached to and support foil 3. Means, not shown, may be provided, such as hydraulic pistons to connect struts 27 to transom wall 23 to adjust the rotational position of the struts and thereby articulate foil 3 to different angles of attack. Alternatively, foil 3 and its supporting struts may be permanently fixed at a predetermined position for the particular vessel.

Foil 3 extends transversely of the vessel's longitudinal vertical centerline plane and substantially equally to each side thereof. The fore to aft position of the foil relative to the vessel is desirably with its leading edge at and a distance below trailing edge 22 to avoid turbulence therebetween, preferably a distance equal to at least six inches (15 cm) but, if possible, not so far below as to increase the draft of the vessel. If there is a step, as in the case of step 4, the foil should be positioned horizontally below the bottom most edge of the step. Fore-to-aft, the leading edge of the foil is positioned vertically at the trailing edge of the vessel, as at trailing edge 7.

As will be described in more detail the chord of the foil 3 is generally parallel with or at a slight angle to horizontal. By changing the rotational position of struts 27 at attitude of the foil to the horizontal (and thus to the flow direction) may be adjusted within a range desirably of plus or minus ten to twenty degrees.

Figure 21:
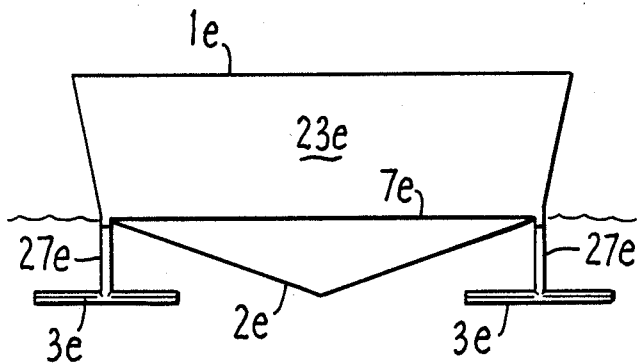
FIG. 21 is an outline view taken from the stern of a vessel showing an alternative foil configuration and mounting arrangement.

The foil or foils may be positioned laterally to the vessel's longitudinal centerline in various ways as may be desired, so that their resultant force at a particular fore-to-aft location is at the centerline. Thus as in the illustration above a single foil may span across the centerline, one half to each side. Alternatively, a separate foil may be placed to either side of the centerline and equidistant thereto as shown in FIG. 21. The foil mounting in this embodiment is particularly useful for locations forward of the stern. Each foil 3e is fixed to the hull by a hydrodynamically shaped struts 27e in a predetermined orientation (angle of attack) to the flow.

The foil is the preferred means of generating downward force in accordance with this invention. For this purpose the foil may be symmetrical and thus generate downward force by presenting an angle of attack with the flow, with the trailing edge above the leading edge as viewed transversely to the flow direction. For greater efficiency the foil may be cambered more highly on the downward side to provide negative lift (downward force) and is then presented at an angle of attack to augment that negative lift, as needed. Desirably, the profile of the foil is such as to maximize downward force while minimizing induced drag over a wide angle of attack range in the negative direction (with the leading edge lowered relative to the trailing edge) of up to 10 degrees and over a wide range of speeds. Additionally it is desirable for the foil to operate efficiently in the positive direction (with the leading edge raised) up to 5 degrees or more to produce an upward force. (Such upward force capability may be useful in some cases in for vessels of this invention for countering pitching forces in heavy seas.) For these purposes special foils, which form another part of this invention, are advantageously employed to minimize induced drag and, at the same time, contribute in a novel manner to the maintenance of trim and avoidance of turbulent interaction with the flow passing the hull surfaces, particularly with the flow separating at the stern trailing edge.

To avoid turbulent interaction with flow passing the hull, foils are advantageously configured so that the flow passing their trailing edge (the "downwash") is diverted downwardly, the same direction as the force generated by the foil, as contrasted to conventionally lifting foils or wings for which the downwash is in the direction of the generated force. When suitably configured at their trail portions, foils which are cambered forward of a trailing portion thereof (preferably, differentially cambered with an overall greater camber on the underside) to generate a downward force when the leading edge is presented to the flow at a negative angle of attack may achieve such diverted flow. The trailing portion of such foils, desirably at least the trailing 15%, preferably at least the trailing 20% and up to about the trailing 40% of the foil length, measured along the chord, are configured with the upper surface extending convexely downward to the trailing edge and the under surface extending to the trailing edge with at least substantially less convexity and, desirably is substantially linear and preferably concave.

To minimize induced drag the foils of this invention, are configured with a lower surface beginning from a point between about 25 to 55% of the chord distance from the leading edge, which, toward the trailing edge, curves upwardly to a point 85% of the chord length from the leading edge which is a distance from the chord less than 50% of the distance between the chord and the lower surface at the beginning point. Additionally, the foils may have a relatively narrow profile, desirably with a maximum thickness to chord length ratio of 0.15 and preferably between 0.03 and 0.09.

Advantageously, for very high speed operation, such foils may be further modified as to the configuration of the upper surface and by the addition of a step or steps on the foil. The modified upper leading surface configuration comprises a substantially flattened or linear surface extending from a fine leading edge between 30% and 50% of the chord distance toward the trailing edge. Steps may be positioned on the foil at a point along either the upper or lower surface at or toward the trailing edge preferably at a location where the surface in both the leading direction and the trailing direction extends parallel with or inwardly towards the chord. The step may extend at a right angle toward the chord for a distance of 0.1 to 10% or more of the maximum thickness of the foil. The affect of the foils is to provide a non-linear response. At higher speeds flow separation will occur at the step. For a step on the lower surface, this results in a decrease in force in the downward direction and for a step on the upper surface, an increase in the force in the downward direction. For application of this these foils in vessel in accordance with this invention a step on the lower surface is particularly advantageous in order to provide a less increase in the downward force at very high speeds.

In FIG. 16 foil 3 has a leading edge 43, a trailing edge 44, an upper surface 45 and a lower surface 46. A base or reference line 47 is shown extending from trailing edge 44 towards leading edge 43, at the attitude or, angle of attack, at which foil 3 generates no left either upward or downward. The leading edge 43 comprises a generally streamlined nose. Upper surface 45 aftward from the nose is convex with maximum convexity at a point between 7 and 20%, and preferably, as shown, at 10% of the chord distance from the leading edge. Surface 45 is concave from the indicated point of maximum convexity to another node point of maximum convexity 48 and then is convex downwardly to trailing edge 44. Lower surface 46 is convex from leading edge 43 to the point of maximum distance from the chord located at 49 and curves from there to trailing edge 44 gradually up toward the chord and becoming slightly concave. At 85% of the chord distance from leading edge 43, the distance of the lower surface 46 to the chord is approximately 30% of that at the point of maximum distance 49. The foil chord length of this example is 49.5 inches (125.7 cm) and the thickness to length ratio is 0.046. The perpendicular distance in inches of the surfaces from base line 47 at each of stations 1 through 33 are found in TABLE I. The spacing between stations is 1.5 inches (3.8 cm).

TABLE I

| | Distance between Baseline and Foil Surfaces in FIG. 16 | |
|---|---|---|
| STATION | UPPER SURFACE | LOWER SURFACE |
| 0 | 0.00 | 0.11 |
| 1 | 0.27 | 0.13 |
| 2 | 0.52 | 0.15 |
| 3 | 0.72 | 0.21 |
| 4 | 0.89 | 0.30 |
| 5 | 1.00 | 0.38 |
| 6 | 1.10 | 0.46 |
| 7 | 1.16 | 0.53 |
| 8 | 1.18 | 0.63 |
| 9 | 1.18 | 0.71 |
| 10 | 1.17 | 0.77 |
| 11 | 1.15 | 0.84 |
| 12 | 1.13 | 0.90 |
| 13 | 1.10 | 0.96 |
| 14 | 1.09 | 1.03 |
| 15 | 1.08 | 1.09 |
| 16 | 1.06 | 1.13 |
| MIDLINE | 1.05 | 1.15 |
| 17 | 1.05 | 1.15 |
| 18 | 1.05 | 1.19 |
| 19 | 1.05 | 1.22 |
| 20 | 1.05 | 1.23 |
| 21 | 1.05 | 1.24 |
| 22 | 1.05 | 1.24 |
| 23 | 1.05 | 1.24 |
| 24 | 1.06 | 1.23 |
| 25 | 1.08 | 1.19 |
| 26 | 1.09 | 1.17 |
| 27 | 1.10 | 1.15 |
| 28 | 1.10 | 1.10 |
| 29 | 1.10 | 1.04 |
| 30 | 1.09 | 1.00 |
| 31 | 0.97 | 0.90 |
| 32 | 0.77 | 0.71 |
| 33 | 0.43 | 0.36 |

TABLE II

| | Distance between Baseline and Foil Surfaces in FIG. 17 | |
|---|---|---|
| STATION | UPPER SURFACE | LOWER SURFACE |
| 0 | 0.00 | 0.11 |

TABLE II-continued
Distance between Baseline and Foil Surfaces in FIG. 17

| STATION | UPPER SURFACE | LOWER SURFACE |
|---|---|---|
| 1 | 0.27 | 0.13 |
| 2 | 0.52 | 0.15 |
| 3 | 0.72 | 0.21 |
| 4 | 0.89 | 0.30 |
| 5 | 1.00 | 0.38 |
| 6 | 1.10 | 0.39 |
| 7 | 1.16 | 0.46 |
| 8 | 1.18 | 0.52 |
| 9 | 1.18 | 0.58 |
| 10 | 1.17 | 0.65 |
| 11 | 1.15 | 0.72 |
| 12 | 1.13 | 0.77 |
| 13 | 1.10 | 0.84 |
| 14 | 1.09 | 0.89 |
| 15 | 1.08 | 0.96 |
| 16 | 1.06 | 1.00 |
| MIDLINE | 1.05 | 1.04 |
| STEP | — | 1.15 |
| 17 | 1.02 | 1.15 |
| 18 | 0.96 | 1.19 |
| 19 | 0.89 | 1.22 |
| 20 | 0.82 | 1.23 |
| 21 | 0.76 | 1.24 |
| 22 | 0.70 | 1.24 |
| 23 | 0.63 | 1.24 |
| 24 | 0.57 | 1.23 |
| 25 | 0.51 | 1.19 |
| 26 | 0.44 | 1.17 |
| 27 | 0.38 | 1.15 |
| 28 | 0.32 | 1.10 |
| 29 | 0.25 | 1.04 |
| 30 | 0.19 | 1.00 |
| 31 | 0.13 | 0.90 |
| 32 | 0.08 | 0.71 |
| 33 | 0.00 | 0.36 |

In FIG. 17 foil 3 is shown with the modifications described above for high speed operation and otherwise is identical to the foil of FIG. 16. Specifically, the leading portion 50 of the upper surface is substantially linear beginning from leading edge 43 a distance towards trailing edge 44 equal to 45% of the chord length. The nose at leading edge 43 is considerably finer than for the embodiment of FIG. 16. The forward portion 51 of the lower surface 46 retain generally the same curvature but toward and up to the midpoint of the foil is spaced more closely to the chord. A step 52 is located at the midpoint having height equal to 5% of the maximum thickness of the foil. The distances of the surfaces from the base line at stations 1–33 are found in TABLE II similarly as for the embodiment of FIG. 16. The thickness to chord length ratio is 0.045.

As best seen in FIG. 9, at the bow 28 extending downwardly from a point above the waterline to a curved and streamlined leading portion of the forefoot 29 forward of the vertex (leading edge) 30 of the bow is bow foil 31 for the purpose of decreasing friction and turbulence at the bow as described in copending U.S. application Ser. No. 07/017,567, filed Feb. 24, 1987. Bow foil 31 is a foil having surfaces with equal camber and having a maximum thickness to chord ratio of 0.063 with the maximum thickness at a point 45% of the chord length from the leading edge. The chord length (21 inches or 53.3 cm) is 6.4% of the vessel's mean chine beam.

The bow foil is employed uniquely in the present invention in cooperation with the fine and deep bow entrance. The bow foil "splits" the water confronting the bow (i.e. imparts outward momentum thereto) and to maintain the laminarity of this flow as it passes the bow which greatly enhances the ability of the entrance to further split the flow and conduct it aftward along the planing floor with a minimum of turbulence.

The bow foil, as utilized in accordance with this invention, is configured to minimize turbulence and friction both by streamlining of its shape and by providing it with a smooth and polished surface. The foil, desirably, is neutral. That is, configured so as to exert no substantial net force in either direction perpendicular to the direction of movement of the foil in water when its chord extends in the direction of movement. Preferably, the camber or contour of the foil on one side of the chord substantially mirrors that on the other so that the foil is balanced or symmetrical relative to its chord. In its simplest form for small vessels, the foil may be a thin flat plate rounded at the leading and trailing edges. Generally, however, the foil will vary in thickness throughout its chord direction, in as streamlined fashion. The leading section of the foil extends forward along the chord from the thickest point of the foil to the leading edge. The trailing section of the foil extends along the chord from the thickest point of the foil to the trailing edge.

In general, the foil is desirably big enough in chord length and in thickness, relative to the size of the vessel to impart sufficient outward momentum to the water at service speed to materially decrease the friction on the vessel hull. The thickness of the foil (at its thickest point) in relationship to its length is desirably 1% to 40% of the chord length, with the thickness point located aft of the leading edge a distance equal to 20% to 80% of the chord length and preferably 20% to 60%. In relation to the vessel, the principal variables influencing the choice of thickness of the foil include the design speed of the vessel, its beam and draft and the distance between the bow and the foil In general, for fast vessels, the "angle of attack" of the foil (the relative sharpness of its leading edge) is desirably narrower.

The foil is desirably positioned on the vertical longitudinal center plane of the hull of the vessel, with its chord coincident with such vertical center plane. The span of the foil extends a substantial distance below the waterline of the vessel, and, desirably, from the waterline down to the keel line. Along its span below the waterline the trailing edge of the foil confronts and is spaced forwardly of the bowpeak at any point horizontally adjacent thereof. The term "bowpeak" is intended to mean the forward point of the vessel at any given elevation above or below the waterline. In most cases at most or all elevations this will be the leading edge of the bow but it can also be other structure, such as a bulb, keel or the like.

For best performance the foil is positioned with its trailing edge parallel to the bowpeak throughout its length below the waterline. However, if desired, the foil may be at a different angle to the bowpeak, for example, vertical. Desirably, also, the foil is positioned with a forward rake, i.e. inclined forwardly in the upward direction.

The spacing of the foil from the bowpeak is important for optimizing the benefits of this invention. The most appropriate spacing will vary with a number of factors, with the distance generally increasing with the service or design speed and with the beam of the vessel and with the thickness and chord length of the foil, and vice versa. While the spacing may thus vary, the foil should be positioned close enough to the bowpeak that, at the vessel's design speed, a useful amount of outward momentum the foil imparts to the water remains when that water passes the vessel's bow.

Usually the trailing edge of the foil should be spaced from the bowpeak in order to obtain the full benefits of the invention. That spacing may vary not only in accordance with the factors already mentioned above, but also with the degree of sharpness of the bow, the sharpness of the trailing section of the foil and other factors influencing the degree of friction and turbulence that is generated at the region of the foil trailing edge and the bowpeak. However, the bowpeak and the foil trailing edge should desirably be spaced apart a distance such that a continuous streamline condition is maintained in the water as it passes adjacent the foil trailing edge and the bow. The more full or bluff the bow or the trailing section of the foil, the wider the spacing that is needed therebetween to maintain streamline flow in the adjacent region. In practice, the foil is desirably spaced from the bowpeak at any horizontal point at a horizontal distance equal to or greater than the maximum thickness of the foil (measured from the trailing edge of the foil). Particularly for higher speed vessels, a spacing of between 1% and 30% of beam width of the hull is desirable.

The entrance of a vessel is that portion of the forebody where the section areas are increasing, i.e. to the point of maximum section such as at the beginning of a parallel middlebody. For the embodiment of FIGS. 2-4 this is approximately at station 4. However, the novel entrance of this invention may be conveniently be described by reference to sections thereof extending 10% and 20% of the waterline length of the vessel aftwardly from the fore perpendicular. In the vessel of FIGS. 2-4, this constitutes the forebody portion extending from the fore perpendicular aftward to stations 1 and 2. By reference to FIG. 8 the entrance 32 is seen to be fine, extending outwardly, both upward and aftward, at a relatively narrow angle. Aft of the fore perpendicular 6 the buttocks 11, as shown in dotted line at station ½ in FIG. 8, are slightly concave in vertical cross-section but, if desired, may be straight. In the vertical direction the entrance is exceptionally deep for a planing vessel, with the lower margin 33 thereof aftward of perpendicular 6 to station 2, at a draft of approximately 69⅞ inches (177.3 cm), about 135% of the deepest draft aftward of entrance 32. The lowest extremity of the entrance is constituted of forefoot 29 connected aftwardly to and forming a part of a skeg 34 bearing forward wing 35 which will be described in detail subsequently. However, to be noted here is that the skeg with its narrow profile and small volume, together with forefoot 29, forms the lower most portion of the entrance. Aftwardly of station 2 of entrance 32 planing floor 11 continues to drop gradually, lowering in angle closer to the horizontal, as shown in FIG. 7.

As may be seen, the fine, deep entrance 32 has a relatively low volume and hence low buoyancy. Also it has a large wetted surface disposed at a high vertical angle which can engender substantial negative lift. The amount of surface disposed in the horizontal plane which could generate positive lift is relatively small.

The effective depth of this novel entrance for a planing vessel may be characterized by the mean depth or draft over its length or a forward portion thereof. Mean draft may be estimated by dividing the area on the longitudinal vertical centerline plane that falls within the entrance, by the length of the entrance.

The mean draft thus estimated may be compared with the deepest draft of the vessel aft of the entrance, typically at around station 4 to 7. Desirably, in the practice of this aspect of the invention the entrance is designed relative to the rest of the vessel so that the mean draft of the entrance portion extending at least 20% or even 10% of the waterline length of the vessel aft of the fore perpendicular is at least 80% of deepest draft aft of the entrance and desirably equal to and even up to 175% greater than deepest draft aft of the entrance, including the draft at midships. For the embodiment of FIG. 1 the mean draft of the forebody from the fore perpendicular to station 1 is 117% and from the fore perpendicular to station 2 is 126% of the deepest draft aft of entrance 32 (48.1 inches or 122.2 cm at about station 2 to station 6). Mean draft is estimated by first determining the area of the longitudinal centerline plane below the design waterline and between the fore perpendicular and stations 1 and 2, respectively, that is bordered on the downward and forward sides by the line of maximum extension of the entrance (including a skeg or equivalent keel extension).

The narrowness or fineness of the forebody and the relative absence of effective planing surface at the entrance may be characterized by the ratio of mean chine beam to draft (excluding the depth of any skeg or wing). Beginning from the fore perpendicular even up to station 2 that ratio will change greatly in the transition towards the drastically smaller raise of floor aftmidships. However, the ratio of mean chine beam to keel line draft (not including the depth of a skeg or other projection below the keel line in determining draft) at the reference plane at each of stations 1 and 2 is a convenient measure of the overall fineness of the entrance both for characterization and design purposes. Desirably the ratio of mean chine beam to keel line draft at station 2 (23% percent of the vessel's length aft of the fore perpendicular) is less than 4 and less than 3 at station 1. For the vessel of FIG. 1 the beam to keel line draft ratio at station 2 is 3.06 and at station 1, 1.6.

It is to be understood that the foregoing are essentially useful conventions for ease of characterization and understanding of an entrance uniquely suitable for use in this invention. Expressed conceptually, a planing vessel in accordance with this invention will follow the general principles of providing lower volume and buoyancy forward, providing less lifting (planing) surface forward and providing a greater amount of wetted surface forward that may generate negative lift forces, which together cooperate uniquely with the dynamic forces provided aftward to create an efficient and stable vessel. Looked at in another way, a highly efficient entrance is provided, which for a planing vessel would otherwise be of questionable stability and possibly dangerous, that in addition to providing its efficiency will cooperate with aftward dynamic forces to trim the vessel and develop the important additional efficiency which accrues. Namely, the thin, deep entrance thus permitted, avoids the build up of pressure under the bow and consequent spray root that so decreases the efficiency of conventional planing vessels.

The foreward skeg of this invention is located forward of midships desirably extending along the longitudinal centerline plane of the vessel aftward from the region of the fore perpendicular. It may usefully extend as far aft as 30 to 40 percent of the distance to the aft perpendicular. The skeg is attached to and may extends down from the keel of the vessel along the hull line a distance typically of between three inches (7 cm) and as much as fifteen feet (460 cm), depending on the size of the vessel and its draft. Desirably this distance is equal to between one fourth of a percent of mean chine beam and preferably three quarters of a percent or greater, even as high as five percent of the mean chine beam distance. In proportion to the draft of the vessel this distance downward from the keel line desirably is at least 10% of the extreme draft of the vessel without the skeg. The skeg will be constructed to meet the structural demands imposed by the yaw, turning and other forces it will encounter and the structural demands of carrying as forward wing or plane if mounted thereon as will be described. The skeg will be streamlined to minimize the friction and turbulence it creates and it is advantageously foil shaped with relatively sharp leading and trailing edges.

In the embodiment of FIGS. 2 through 4 skeg 34 is a downward continuation of the bow Fore-to-aft, skeg 34 extends 261 inches (663 cm), from the fore perpendicular to approximately station 2 and is 20 inches (50.8 cm) deep. As better seen in FIG. 9, skeg 34 is foil shaped with the same curvature on each surface and the chord direction fore-to-aft. The maximum thickness is approximately 9.4 inches or 23.9 cm (0.027% of the chord distance) and this occurs 50% of the chord distance from the leading edges 36. It can be seen that the depth of skeg 34 is substantially greater than its thickness.

The foreward skeg, with or without a wing mounted thereon because of its positioning is more effective in countering the forces acting on the bow and other forward portions of the vessel to move it of course, particularly yaw forces. A foil shape will enhance the effect of skeg in imparting directional stability to the vessel as the lateral pressure of the flow along its leading edge will tend to bias the skeg against lateral movement in either direction.

Importantly, when it is utilized together with the other aspects of this invention the skeg also acts as a downward extension of the entrance which adds to the negative pressure differential and hence downward suction force at the bow. This force will cooperate with an aftward dynamic downward force and upward planing forces acting between the skeg and the aft downward force to maintain vessel trim.

The forward wing or plane is also to be located forward of midships and for maximum effect will also extend aftwardly of the region of the fore perpendicular. Depending upon its shape the wing or plane may usefully extend aftwardly as far as 30 to 40 percent of the distance to the aft perpendicular. In addition to a more conventional wing structure the forward wing or plane may take the form of a relatively flat or transversely concave surface at the keel which faces generally downwardly of the hull and extends fore-to-aft along the keel and may actually be an appropriately shaped outer surface (bottom) of the keel, itself. The planing surface of the wing or plane may be slightly convex and still generate adequate planing force it should be substantially non-convex both fore-to-aft and transversely.

In general aspect the forward wing is designed to have a streamlined and low resistance profile. In the broadcast sense that the term wing is used herein, it need not be foil shaped or have a lifting capacity or capability. However, the wing may be advantageously provided with a lifting capability as a plane or wing and thus be utilized to also provide a dynamic lifting or depressive force on the vessel forward of midships for trim control, either independently of or in cooperation with the other trimming forces in accordance with this invention.

The forward wing or plane acts efficiently because of its design, positioning and its orientation relative to the vessel travel direction. Also in the form of a discrete wing utilized as well as a damper, its mode of operation in decreasing pitch is dynamic, i.e. by its friction, pressure and drag in the water vertically, and it is thus more efficient as compared to static dampers, such as ballast tanks, which increase the weight and thus the wetted surface which, in turn, increases the friction on the ship.

Advantageously, as shown in the embodiment of FIGS. 2 through 4, the forward wing 35 may be attached to the underside margin of the forward skeg 34 and supported thereby. Alternatively, the wing may be fixed to the sides of the hull at some forward position, desirably at or close to the bow, and extent out therefrom mounted somewhat similarly to roll suppressor fins or wings which are conventionally mounted on vessel hulls amidships. The forward wing may also be mounted in a similar fashion on opposite sides at the lower end of a bow foil attached at the bow of the vessel as previously described.

The wing desirably has a dimension in the vertical direction (with respect to the vessel's orientation) that is smaller on average than its chord distance (width), which extends generally in the horizontal plane, usually by a ratio of at least 1 to 2 and preferably of 1 to 10.

The wing desirably is bilaterally symmetrical about a longitudinal median axis and is positioned with its longitudinal median axis coincident with the vertical longitudinal centerline plane of the vessel and its lateral axis perpendicular to such centerline plane. The wing is mounted on the skeg both for ease of positioning relative to the vessel and to space the wing from the keel so there is adequate head of water above the wing to impede its upward movement.

The wing advantageously has a generally swept back configuration, preferably of a delta design as illustrated in FIGS. 1-4, with the leading apex 37 in the foreward direction of the vessel to the point where the keel line meets the bow, although it may project a distance in advance of the bow juncture or begin a distance aft thereof. The angle of sweep black of the leading edges 36 of the wing 35 from the perpendicular to the vessel vertical longitudinal centerline plane is desirably at least forty five degrees. For the advantageous longer wing between 5% and 30% of the vessel length at waterline, the angle between the leading edge on either side of the longitudinal vertical centerline plane is desirably between 1 and 15 degrees (i.e. an angle of sweep from the longitudinal vertical centerline plane for each leading edge of 82½ to 89½ degrees) and in the illustrated embodiment 2 degrees. The wing surfaces 37 for this type wing are preferably substantially planar and dihedrally disposed, i.e. angled with respect to the horizontal toward their outboard margins at leading edges 36, downwardly, preferably 2 to 15 degrees. This is for the purpose of channeling the flow along the center of the wing to further enhance directional stability. Preferably the leading edge 36 to either side is linear. The swept back wing design has the particular advantage that only a minimum amount of rounding or streamlining is required of the leading edges in order to present a low resistance profile in the vessel travel direction thus permitting more blunt profile in the vertical direction for drag or resistance to pitch. The swept back wing located at the entrance foremidships desirably extends between 5 and 30 percent of the waterline length of the vessel. In the example of FIGS. 2-4, wing 35 extends twelve feet (366 cm), from aft of the fore perpendicular 6 aftward to about station 2.

The swept back wing may be modified is shown in FIG. 11 by the bilateral addition at leading edges 36 of swept forward wing extensions 38 which extend outboard at an acute angle to the longitudinal centerline of the vessel in the travel direction and are disposed in the same plane as the wing surface to either side, i.e. at the same dihedral angle as shown. As seen in FIG. 13, forward wings are foil shaped and have symmetrical surfaces, but they may be differentially cambered to provide lift even at a zero angle of attack. As well as providing additional lift, forward wing extensions 38 will conduct flow from their tips 39 inboard to skeg 34, thereby enhancing the directional stabilization of the vessel.

The alternative skeg mounted forward wing illustrated in FIG. 12 has leading margins beginning at leading edge 36b, which connect to in a generally elliptical configuration to trailing apex 42, and a planar surface 37b.

If lifting force on the wing is not desired, as when it is to be used as a damper only, the wing surfaces are positioned accordingly, which for a fully planer wing would be horizontally. This may be approximated by making such surfaces parallel to the baseline plane of the vessel. However, as is explained in more detail, the forward wing or plane may serve another important function in another context of this invention, that of providing a positive or negative lifting force on the foreward section of the vessel. For this function the forward wing may be set at an angle of attack to provide the desired lift in the desired vertical direction. To thus utilize the forward wing to create a vertical force on the bow, the wing may be positioned at an angle with the horizontal, or by approximation, with the base plane of the vessel. For a relatively long wing, e.g. extending aftwardly between 15 to 30 percent of the waterline length of the vessel, a minor angle of up to five degrees in the desired direction from the horizontal may generate an adequate force. For shorter wings the angle may be correspondingly wider. If desired, the wing may be mounted so that the angle of the wing surfaces to the horizontal may be rapidly adjusted during operation of the vessel. For example a planar delta wing may be pivotally mounted on the skeg at its forward apex and the trailing end of the wing secured to the skeg by hydraulically operated jacks for vertical adjustment.

The forward wing will perform an important function in cooperation with the fine and deep entrance of this invention to compensate for the lack of planing surface at this entrance and for the negative lift generated by suction forces at this entrance which can otherwise impart instability to the vessel, particularly in disturbed water. The attitude of the forward wing may be set to provide an upward force, desirably a one to ten degree angle downwardly at the trailing edge in the case of the swept back wing or other elongated planing surface. This upward force will supplement the dynamic forces acting aftwardly, in supporting the bow to maintain trim and, importantly, to counter downward pitching forces which tend to submerge the bow. The forward plane will thereby permit the use of a finer bow, with its increased efficiency, and at the same time reduce the extent of aftward downforce necessary to support it. This, in turn, will permit the use of a smaller and hence more efficient aftward downforce foil. In the embodiment of FIGS. 2-4 the wing 35 is fixed at an average angle of two degrees downwardly at the aft to provide a dynamic upward force for this purpose. Optionally, if desired, the forward wing may be utilized in this invention to provide a dynamic downward force component to supplement a downward force at an aftward location.

In other embodiments, particularly those in which the span direction extends generally outboard of the vessel, the wing may comprise a foil to each side of the longitudinal vertical centerline plane with the span of each, or a portion thereof, extending generally outwardly of such plane. If no lifting force is desired, then a neutral or symmetrical foil shape may be selected and the foil positioned with its chord parallel to the vessel travel direction. Or, if the foil has an unbalanced or lifting profile, it would be positioned with an angle of attack which would cancel out the lifting force otherwise created by that profile. Alternatively, the wing may be fixed to the sides of the hull at some forward position, desirably at or close to the bow, and extend out therefrom, mounted somewhat similarly to roll suppressor fins or wings which are conventionally mounted on vessel hulls amidships.

However, to provide a lifting or depressing force on the forward section of the vessel, this type of forward wing may be set at an angle of attack that gives the desired lift in the desired vertical direction. Either a neutral or a cambered foil may be employed and positioned appropriately to give the desired vertical force on the vessel. If desired, the foil may be mounted so that the angle of attack is easily adjustable during operation of the ship, in order to vary the vertical force it imposes at any particular speed of the vessel.

The amount of lifting and/or dampening force provided by the forward wing will also vary with its positioning at the entrance and with the amount of planing surface, measured as the area subtended by the wing in the horizontal plane. For maximum affect, the wing is positioned in the forward thirty percent of the vessel's waterline length and preferably in the forward twenty percent as shown in the embodiment of FIGS. 2-4. In that region, the planing surface, essentially the area in the horizontal plane subtended by the wing, desirably is at least two and less than seventy square inches per foot (0.4 to 15 sq. cm/cm) of the vessel's waterline length and preferably between five and fifty square inches (1 and 10 sq. cm/cm). The area of the planing surface 37 on the underside of wing 35 of FIGS. is approximately 9 square feet (8361 sq. cm). Particularly for high speed operation the planing surface is desirably elongate fore-to-aft with an average width transversely of the hull of less than one fourth and preferably less than one eighth of the fore to aft length of the planing surface.

Either the forward skeg or the forward wing may be employed on a vessel alone or together and with or without the other features of this invention. In this respect, the forward wing and skeg are advantageous for displacement vessels and particularly for displacement hulls that have a fine, deep entrance and a generally narrow profile such as for a displacement vessel with a waterline length to beam ratio greater than 6, and particularly greater than 6.5 or 7. An example of such a hull can be seen in the typical catamaran hull such as described in United Kingdom patent application No.

2,082,125. By raising the bow with the efficient and practical forward wing of this invention, the downward forces at the bow can be counteracted in a practical to decrease submergence at the bow and thus decrease friction on the hull.

However, the skeg and forward wing are of particular advantage as well in a vessel in combination with the basic trim and have control features of this invention because of cooperative relationships described. Additionally, since the trim and heave control features will tend to maintain the bow in the water more constantly in heavy seas, the skeg and forward wing will thus be more constantly under water to make their contribution in reducing yaw and pitch.

It will be seen that the fine, deep entrance, aftwardly rising floor configuration and pressure release floor, all novel for a planing craft, may be employed advantageously, alone and particularly in combination, to improve performance, even without the aftward downforce of this invention.

It will also be seen that in employment of this invention with a multiple hull vessel, for example a catamaran or trimaran, that each hull may embody one or more of the described features, e.g. a narrow and deep entrance, forward skeg, forward wing, bow foil, planing floor rise to the stern as described, a stern pressure release zone and associated transverse step, and flow separation chine fins at the stern. Preferably, at least the outer hulls are identical to each other as to these features. A transverse foil or group of foils for generating a downward force, as previously described, would still desirably be bilaterally symmetrical of the longitudinal centerline plane of the vessel. However, the centerline plane would be central of the entire vessel and this would be, in the case of a catamaran, equidistant between the two hulls.

The operation of the vessel of the embodiment of the invention as shown in FIGS. 1-4 with the foil set at a negative angle of 5 degrees (leading edge horizontally below the trailing edge) from a standard tank test of a model of a scale of 24 to 1 pulled through the water will now be described. At rest, vessel 1 will ride in the water at zero trim. At low speeds, up to around 8 knots, the vessel will be in displacement mode. As speed increases to the 30 knot range planing force will increase and, at the same time, the downward force imparted by foil 3 and the suction forces at the bow will also increase. These forces will generally offset each other to maintain a dynamic fore-to-aft balance of the vessel. The vessel will continue generally in trim through a speed range up to approximately 60 knots, with no signs of instability, even in disturbed water equivalent to 3 and 6 foot waves with wave periods from 4 to 16 seconds. The heave of the vessel throughout the speed range is slightly negative, i.e. the draft and, hence, the wetted surface is increased, with the vessel below the at rest waterline as much as 5 inches or 12.7 cm (approx. 10% of draft). The maximum rise of the bow at all speeds is approximately 0.6 degrees, and at higher speed the bow is at a negative trim angle of as much as 0.3 degrees.

The lack of planing surface at the entrance (other than the forward wing) and the downward suction force bias the bow downward to prevent the rise of the bow normal to conventional planing craft. At the same time, the upward force of the forward wing 35 and of the aftward "lever arm" of the downward force at the stern and the midships upward planing force bias the bow upward to prevent the bow from digging in.

Throughout the speed range the usual large spray root and bow and stern wakes of a planing vessel are absent. With increasing speed the stern foil 3 and the forward wing 35 and skeg 34 tend to hold it to trim in a highly stable and straight course.

I claim:

1. A vessel of improved performance comprising a hull having planing surfaces aft of the entrance capable of generating a substantial dynamic lifting force on the hull, a fine, deep entrance with steeply sloped surfaces capable of generating in the water flow dynamic downward forces on the bow sufficient at speed to counter aftward lifting forces to maintain the hull at a small trim angle and means spaced from said hull and responsive to the flow passing the hull for applying an aftward downward force on the hull with a locus in the transverse direction of the vessel that is substantially at the longitudinal centerline plane thereof, which downward force, together with said dynamic downward force at the bow, is of sufficient at speed to offset a substantial portion of the dynamic lifting forces on the hull, thereby to substantially restrict the rise in the water of the hull caused by the planing forces.

2. A vessel as in claim 1 and wherein said aftward downward force is greater than 1% of the displacement weight of the hull and said downward forces at the bow are sufficient to maintain the hull at a trim angle of less than about 2 degrees.

3. A vessel as in claim 1 and wherein said aftward downward force is at the stern and wherein said downward forces at the bow and said aftward downward force are together sufficient at speed to maintain the decrease in wetted surface from that at rest at less than two thirds of the decrease that would occur at speed without said downward forces.

4. A vessel of improved performance comprising a hull having planing surfaces aft of the entrance capable of generating a dynamic lifting force greater than 5% of the displacement weight of the vessel, a fine, deep entrance with steeply sloped surfaces which generate in the water flow dynamic downward forces on the bow and with surfaces generating lift forces in the water flow being limited in amount and configuration whereby the downward forces generated by the steeply sloped surfaces predominate, at speed, to maintain the hull at a small trim angle, said entrance extending from the fore perpendicular of said hull to and aftward of a fore-and-aft position located at a distance aft of said fore perpendicular equal to ten percent of the waterline length of said hull, the mean draft at said entrance between the fore perpendicular and said fore-and-aft position being at least eighty percent of the greatest draft of said hull aft of said entrance, and means spaced from said hull and located at midships for generating a dynamic downward force, said means comprising a foil mounted below the waterline of said hull, said foil having a chordwise axis generally aligned with the longitudinal direction of said vessel and a spanwise axis generally transverse to said longitudinal direction and said foil being hydrodynamically contoured and angularly positioned about its spanwise axis so that with the vessel moving forwardly through water said foil generates a downward force generally aligned with vertical axis of the vessel of a magnitude to substantially restrict the rise in the water of the hull caused by the planing forces.

5. A vessel as in claim 4 and wherein said foil is cambered more highly on the downward side and is located at the stern of said hull and said hull has a waterline beam at the stern that is about equal to or greater than the waterline beam at midships.

6. A vessel as in claim 4 and wherein said entrance has a generally V-bottom configuration and the waterline beam to draft ratio at said fore-and-aft position being no greater than 3.

7. A vessel as in claim 6 and wherein said hull has generally V-bottom floor integral therewith and extending aftward, with a gradually decreasing rise of floor from the base plane of the hull, from the fore perpendicular to a transverse trailing edge at the stern generally parallel with the base plane of the hull, to form planing surfaces capable of generating a dynamic lifting force greater than 10% of the displacement weight of the hull, said floor rising from midships to said stern trailing edge a distance with respect to the base plane of the hull equal to at least 50% of the draft at midships, and said foil is located at the stern of the hull.

8. A vessel as in claim 4 and wherein said entrance is of a generally V-bottom configuration and extends from the fore perpendicular of said hull to and aftward of a fore-and-aft position located at a distance aft of said fore perpendicular equal to twenty percent of the waterline length of the hull, the mean draft at said entrance between the fore perpendicular and said fore-and-aft position being at least equal to the greatest draft of the hull aft of said entrance and the waterline beam to draft ratio at said fore-and-aft position being no greater than 4, and said foil is capable of generating a downward force that is greater than 5% of the displacement weight of the hull when said hull is moving through water at speed.

9. A vessel as in claim 4 and wherein said planing surfaces include a forward planing surface facing generally downwardly of said hull and extending fore-and-aft along the keel thereof forward of midships, said surface being elongate in the fore-and-aft direction and being positioned with an angle of attack in the fore-and-aft direction to generate an upward force when moving through the water.

10. A vessel as in claim 4 and wherein said entrance has a generally V-bottom configuration and said hull has a swept back wing secured thereto below the waterline forward of midships, said wing being bilaterally symmetrical about a longitudinal median axis and positioned with said axis coincident with the longitudinal vertical centerline plane of said hull and the angle of sweep of the leading edges thereof being at least 45 degrees from the perpendicular to said longitudinal vertical centerline plane and with an angle of attack in the fore-and-aft direction to generate an upward force when moving through the water.

11. A vessel as in claim 10 and wherein said swept back wing extends a fore-and-aft along the longitudinal vertical centerline plane a distance equal to at least five percent of the waterline length of the hull and is of a generally delta configuration with a planing surface on the underside thereof and with the leading edges thereof to either side at a horizontal angle of between 1 and 15 degrees, said hull has a skeg attached to and extending vertically downward from the keel line at the entrance and extending fore-and-aft along the longitudinal vertical centerline plane a distance equal to at least five percent of the waterline length of said hull, the depth vertically of said skeg being substantially greater than the thickness thereof and said wing is spaced downwardly of said keel line and is secured along the downward margin of said skeg.

12. A vessel as in claim 4 and wherein said hull has generally V-bottom floor integral therewith and extending aftward, with a gradually decreasing rise of floor from the base plane of said hull, from the fore perpendicular to a transverse trailing edge at the stern generally parallel with the base plane of the vessel, to form planing surfaces capable of generating a dynamic lifting force greater than 5% of the displacement weight of the vessel, said floor rising from midships to said stern trailing edge a distance with respect to the base plane of said hull equal to at least 25% of the draft at midships.

13. A vessel as in claim 4 and wherein said hull has a generally V-bottom floor integral therewith and extending aftward, with a gradually decreasing rise of floor from the base plane of the hull, from the fore perpendicular to a transverse trailing edge at the stern, to form planing surfaces capable of generating a dynamic lifting force greater than 10% of the displacement weight of the hull, said floor rising from midships to said stern trailing edge a distance with respect to the base plane of the hull equal to at least 50% of the draft at midships, and said foil is located at the stern of the hull.

14. A vessel as in claim 4 and wherein said trailing edge is generally parallel to the base plane of the hull and is positioned vertically within a distance of the waterline less than 25% of the extreme draft of the hull.

15. A vessel as in claim 14 and wherein said floor extends aftwardly of the point of extreme draft of the hull to a transverse step located, longitudinally, aft of the fore perpendicular of the hull between 75% and 95% of the waterline length of the hull and, vertically, at or above the extreme draft of the hull and a pressure release floor extending aftward of said step to the trailing edge thereof at the aft perpendicular, said trailing edge being transverse to the longitudinal centerline plane, parallel to the base plane of the hull and located vertically from the waterline of the hull a distance less than 25% of the extreme draft of the hull, and the surface of said pressure release floor extending in the transverse direction parallel to the base plane of the hull and extending in the longitudinal direction substantially straight or concave to said trailing edge.

16. A vessel as in claim 4 and wherein said aftward downward force is greater than 5% of the displacement weight of the hull and said downward forces at the bow are sufficient to maintain the hull at a trim angle of less than about 2 degrees.

17. A vessel as in claim 4 and wherein said aftward downward force is at the stern and wherein said downward forces at the bow and said aftward downward force are together sufficient at speed to maintain the decrease in wetted surface from that at rest at less than two thirds of the decrease that would occur at speed without said downward forces.

18. A vessel as in claim 4 and wherein said foil has cambered surfaces over a leading portion thereof to provide the capability in flow to generate a force component in a lift direction normal to the chord of the foil and, at a trailing portion of said foil extending at least 20% of the chord length to the trailing edge, a surface on the side thereof opposite said direction of lift that is convexely curved to the trailing edge and a surface on the lift direction side thereof extending to the trailing edge that is substantially less convex than said surface on the side opposite said lift direction.

19. A vessel of improved performance comprising a hull having planing surfaces capable of generating a dynamic lifting force greater than 5% of the displacement weight of the vessel and a fine, deep entrance of a generally V-bottom configuration with steeply sloped surfaces capable of generating in the water flow flow substantial dynamic downward forces on the bow, the entrance extending from the fore perpendicular of said hull to and aftward of a fore-and-aft position located at a distance aft of said fore perpendicular equal to twenty percent of the waterline length of said hull and wherein the mean draft at said entrance between the fore perpendicular and said fore-and-aft position is at least eighty percent of the greatest draft of said hull aft of said entrance.

20. A vessel as in claim 19 and wherein said planing surfaces are capable of generating a dynamic lifting force greater than 10% of the displacement weight of the vessel and said mean draft is equal to or greater than the greatest draft of said hull aft of said entrance.

21. A vessel as in claim 19 and wherein the waterline beam to draft ratio at said fore-and-aft position is no greater than 4.

22. A vessel as in claim 19 and wherein said planing surfaces include a planing floor gradually flaring outward aftwardly past midships from a sharp V at the bow and wherein the surfaces at said entrance which generate lift forces in the water flow are limited in amount and configuration whereby the downward forces generated by the steeply sloped surfaces predominate, at speed, to maintain the vessel at a small trim angle.

23. A vessel as in claim 22 and wherein the mean draft between said fore perpendicular and a fore-and-aft position located ten percent of the waterline length of said hull aft of said perpendicular is at least eighty percent of the greatest draft of said hull aft of said entrance and the waterline beam to draft ratio at the fore-and-aft position located ten percent of the waterline length of said hull aft of said perpendicular is no greater than 3.

24. A vessel as in claim 23 and wherein said hull has generally V-bottom floor integral therewith and extending aftward, with a gradually decreasing rise of floor from the base plane of the hull, from the fore perpendicular to a transverse trailing edge at the stern, to form planing surfaces capable of generating a dynamic lifting force greater than 10% of the displacement weight of the hull, said floor rising from midships to said stern trailing edge a distance with respect to the base plane of the hull equal to at least 50% of the draft at midships, and said foil is located at the stern of the hull.

25. A vessel as in claim 24 and wherein said trailing edge is generally parallel to the base plane of the hull, is positioned vertically within a distance of the waterline less than 25% of the extreme draft of the hull, and has a waterline length to beam ratio at the stern trailing edge of less then 6.

26. A vessel as in claim 23 and wherein said floor extends aftwardly of the point of extreme draft of the hull to a transverse step located, longitudinally, aft of the fore perpendicular of the hull between 75% and 95% of the waterline length of the hull and, vertically, at or above the extreme draft of the hull and a pressure release floor extending aftward of said step to the trailing edge thereof at the aft perpendicular, said trailing edge being transverse to the longitudinal centerline plane, parallel to the base plane of the hull and located vertically from the waterline of the hull a distance less than 25% of the extreme draft of the hull, and the surface of said pressure release floor extending in the transverse direction parallel to the base plane of the hull and extending in the longitudinal direction substantially straight or concave to said trailing edge.

27. A vessel as in claim 19 and wherein said hull has a bottom floor integral therewith extending aftward, with a gradually decreasing rise of floor from the base plane of the hull, from the fore perpendicular to a transverse trailing edge at the stern, to form planing surfaces capable of generating a dynamic lifting force greater than 10% of the displacement weight of the hull, said floor rising from midships to said stern trailing edge a distance with respect to the base plane of the hull equal to at least 50% of the draft at midships, and said foil is located at the stern of the hull.

28. A vessel of improved performance comprising a hull having planing surfaces capable of generating a dynamic lifting force greater than 5% of the displacement weight of the vessel, an entrance having a generally V-bottom configuration with steeply sloped surfaces capable of generating in the water flow dynamic downward forces on the bow and a skeg attached to and extending vertically downward from the keel line at the entrance and extending fore-and-aft along the longitudinal vertical centerline plane a distance equal to at least five percent of the waterline length of said hull, the depth vertically of said skeg being substantially greater than the thickness thereof.

29. A vessel as in claim 28 and wherein said skeg fore-and-aft between the fore perpendicular and a position along the keel line twenty percent of waterline length of said hull aft thereof for a distance of at least ten percent of the waterline length of said hull and vertically downwardly from the keel line at the entrance a mean distance over such fore-in-aft length equal to at least 10% of the extreme draft of the vessel without the skeg and said skeg is hydrodynamically shaped as a foil.

30. A vessel as in claim 28 and wherein said skeg extends downward from the keel line a mean distance over the fore-and-aft length of the skeg of at least ½ and 5% of the mean chine beam of the hull.

31. A vessel of improved performance comprising at least one hull having a fine, deep entrance of a generally V-bottom configuration with steeply sloped surfaces capable of generating in the water flow substantial dynamic downward forces on the bow and a forward planing surface facing generally downwardly of said hull and extending fore-and-aft along the keel thereof forward of midships, said surface being elongate in the fore-and-aft direction, being disposed bilaterally symmetrically with the longitudinal vertical centerline plane of the hull and being positioned with an angle of attack in the fore-and-aft direction to generate an upward force when moving through the water.

32. A vessel as in claim 31 and wherein said forward planing surface comprises a swept back wing secured to said hull below the waterline forward of midships, said wing being bilaterally symmetrical about a longitudinal median axis and positioned with said axis coincident with the longitudinal vertical centerline plane of said hull and the angle of sweep of the leading edges thereof being at least 45 degrees from the perpendicular to said longitudinal vertical centerline plane.

33. A vessel as in claim 32 and wherein the surfaces at said entrance which generate lift forces in the water flow are limited in amount and configuration whereby the downward forces generated by the steeply sloped surfaces predominate, at speed, to maintain the hull at a small trim angle, said hull has planing surfaces aft of the entrance capable of generating a dynamic lifting force greater than 5% of the displacement weight of the vessel and said wing is positioned downwardly of the keel of said hull and extends along said longitudinal centerline plane a distance of between 5 to 30 percent of the waterline length of the hull.

34. A vessel as in claim 32 and wherein said hull is a displacement hull having a waterline length to beam ratio at the stern greater than 6 and said wing is positioned downwardly of the keel line of said hull and extends along said longitudinal centerline plane a distance of between 5 to 30 percent of the waterline length of the hull.

35. A vessel as in claim 32 and wherein said swept back wing extends a fore-and-aft along the longitudinal vertical centerline plane a distance equal to at least five percent of the waterline length of the hull and is of a generally delta configuration with a planing surface on the underside thereof and with the leading edges thereof to either side at a horizontal angle of between 1 and 15 degrees, said hull has a skeg attached to and extending vertically downward from the keel line at the entrance and extending fore-and-aft along the longitudinal vertical centerline plane a distance equal to at least five percent of the waterline length of said hull, the depth vertically of said skeg being substantially greater than the thickness thereof and said wing is spaced downwardly of said keel line and is secured along the downward margin of said skeg.

36. A vessel as in claim 35 and wherein the underside surface of said wing subtended by the base line plane of the hull has an area of between five and fifty square inches per foot of waterline length of said hull.

37. A vessel as in claim 31 and wherein the surfaces at said entrance which generate lift forces in the water flow are limited in amount and configuration whereby the downward forces generated by the steeply sloped surfaces predominate, at speed, to maintain the hull at a small trim angle, said hull has planing surfaces aft of the entrance capable of generating a dynamic lifting force greater than 5% of the displacement weight of the vessel and said forward planing surface has an average width transverse to the fore-and-aft direction of less than one fourth the fore-and-aft length thereof and a surface area subtended by the base plane of the hull of between two and seventy square inches per foot of the waterline length of said hull.

38. A vessel as in claim 31 and wherein said hull has planing surfaces aft of the entrance capable of generating a dynamic lifting force greater than 5% of the displacement weight of the vessel, said entrance extends from the fore perpendicular of the hull to and aftward of a fore-and-aft position located at a distance aft of said fore perpendicular equal to twenty percent of the waterline length of the hull, the mean draft at said entrance between the fore perpendicular and said fore-and-aft position is at least eighty percent of the greatest draft of the hull aft of said entrance and the waterline beam to draft ratio at said fore-and-aft position is no greater than 4 and said forward planing surface extends fore-and-aft a distance equal to at least 5% of the waterline length of the hull and has an average width transverse to the fore-and-aft direction of less than one fourth the fore-and-aft length thereof.

39. A vessel as in claim 38 and wherein said hull has a generally V-bottom floor integral therewith and extending aftward, with a gradually decreasing rise of floor from the base plane of the hull, from the fore perpendicular to a transverse trailing edge at the stern generally parallel with the base plane of the hull, to form planing surfaces capable of generating a dynamic lifting force greater than 10% of the displacement weight of the vessel, said floor rising from midships to said stern trailing edge a distance with respect to the base plane of said hull equal to at least 50% of the draft at midships, and said foil is located at the stern of the hull.

40. A vessel as in claim 38 and wherein said forward planing surface extends fore-and-aft a distance equal to at least 10% of the waterline length of the hull, has an average width transverse to the fore-and-aft direction of less than one eighth the fore-and-aft length thereof and an area in the horizontal plane of between two and seventy square inches per foot of waterline length of the hull and said mean draft is equal to or greater than the greatest draft of the hull aft of said entrance.

41. A vessel of improved performance comprising a hull having planing surfaces capable of generating a dynamic lifting force greater than 5% of the displacement weight of the vessel, including a planing floor extending aftwardly of the point of extreme draft of said hull to a transverse step located, longitudinally, aft of the fore perpendicular of the vessel between 75% and 95% of the waterline length of said hull and, vertically, at or above the extreme draft of said hull and a pressure release floor integral with said hull and extending aftward of said step to the trailing edge thereof at the aft perpendicular, said trailing edge being transverse to the longitudinal centerline plane, parallel to the base plane of said hull and located vertically from the waterline of said hull a distance less than 25% of the extreme draft of said hull, and the surface of said pressure release floor extending in the transverse direction parallel to the base plane of said hull and extending in the longitudinal direction substantially straight or concave to said trailing edge.

42. A vessel as in claim 41 and wherein said hull has a generally V-bottom extending aftward of the fore perpendicular with a gradually decreasing rise of floor from the base plane of the vessel and has a waterline beam at the stern that is about equal to or greater than the waterline beam at midships, said pressure release floor extends fore-to-aft a horizontal distance equal to between 5 and 20 percent of the waterline length of the hull, the rise of floor fore-and-aft from said step to said trailing edge is equal to between one tenth and one half of draft at midships and said trailing edge is located vertically from the waterline of the hull a distance less than 10% of the extreme of the hull and extends substantially across the waterline beam at the stern.

43. A vessel of improved performance, particularly when a dynamic downward force with an aftmidships locus is applied to the vessel during its operation, comprising a hull having a waterline beam at the stern that is about equal to or greater than the waterline beam at midships and having a generally V-bottom floor extending aftward, with a gradually decreasing rise of floor from the base plane of said hull, from the fore perpendicular to a transverse trailing edge at the stern, to form planing surfaces capable of generating a dynamic lifting force greater than 5% of the displacement weight of the vessel, said floor being integral with and fixed to said hull and rising from midships to said stern trailing edge a distance with respect to the base plane of said hull equal to at leat 50% of the draft at midships, said trailing edge extending generally parallel to the base plane of said hull substantially across the waterline beam at the stern.

44. A vessel of improved performance comprising a hull having a generally V-bottom floor extending aftward, with a gradually decreasing rise of floor from the base plane of said hull, from the fore perpendicular to a transverse trailing edge at the stern, to form planing surfaces capable of generating a dynamic lifting force greater than 5% of the displacement weight of the vessel, said floor being integral with and fixed to said hull and rising from midships to said stern trailing edge a distance with respect to the base plane of said hull equal to at least 50% of the draft at midships, the transverse mean draft between chine lines at a transverse vertical plane 75% of the waterline length of said hull aft of the fore perpendicular is no more than 50% greater than the draft at said plane of the intersection of a straight line between the points of greatest draft at midships and the trailing edge, respectively.

45. A vessel as in claim 44 and wherein said trailing edge is generally parallel to the base plane of said hull and is positioned vertically within a distance of the waterline equal to less than 25% of the extreme draft of said hull.

46. A vessel as in claim 45 and including a substantially planar central floor extending aftward from a point along the keel line at or aft of the extreme keel of said hull which truncates the vertex of said V-bottom floor aft of said keel line point, said central floor being parallel in the transverse direction to the base plane of said hull and extending at an upward angle in the aftward direction to terminate at a transverse edge and being bilaterally positioned about the longitudinal vertical centerline plane of said hull.

47. A vessel as in claim 46 and wherein said transverse edge comprises a step in said V-bottom floor located 5 to 25% of the waterline length of said hull forward of the stern trailing edge thereof.

48. A vessel of improved performance comprising a hull having planing surfaces capable of generating a dynamic lifting force greater than 5% of the displacement weight of the vessel including a planing floor extending to a stern trailing edge thereof which is generally transverse to the longitudinal axis of said hull, a chine line forming an outboard edge of said floor generally parallel with the longitudinal axis of said hull at each side thereof, each chine line extending to a junction with said stern trailing edge, a heel extending transversely outboard to each said junction and having an outboard margin at said junction extending aftward thereof generally parallel to said chine line and upwardly therefrom in a generally curved path to a point above the waterline of the vessel to smoothly separate the flow along said chine line.

49. A vessel as in claim 48 and wherein a fin extends aftwardly along each chine to said junction and aftwardly thereof along said margin to a point above said waterline.

50. A foil having low induced drag having cambered surfaces over a leading portion thereof to provide the capability in flow to generate a force component in a lift direction normal to the chord of the foil and having a lower surface that, beginning from a point about 25 to 55% of the chord length from the leading edge, curves upwardly to a point 85% of the chord length from the leading edge which is a distance from the chord of the foil less than 50% of the distance between the chord and the lower surface at said beginning point.

51. A foil as in claim 50 and wherein a step is located at the lower surface thereof between 25% and 75% of the chord distance from the leading edge.

52. A foil as in claim 50 and wherein the upper surface thereof beginning adjacent the leading edge thereof and extending between 40% to 60% of the distance toward the trailing edge is substantially planar.

53. A method of decreasing the friction and turbulence on a vessel having a hull with planing surfaces aft of the entrance capable of generating a substantial dynamic lifting force and a fine, deep entrance with steeply sloped surfaces capable of generating in the water flow dynamic downward forces on the bow sufficient at speed to counter aftward lifting forces to maintain the hull at small trim angle which comprises imposing on said hull a downward force responsive to the flow passing that at planing force speed, is greater than 1% of the displacement weight of the vessel, at a locus in the transverse direction of the vessel that is substantially at the longitudinal centerline plane thereof and in the longitudinal direction aftmidships.

54. A method as in claim 53 and wherein said planing surfaces are capable of generating a dynamic lifting force greater than 5% of the displacement weight of the vessel and said downward force is imposed by a foil located aftmidships that generates a force equivalent to at least 65% of the displacement weight of the vessel and wherein said steeply sloped surfaces at the entrance are capable of generating enough downward forces, at speed, to maintain trim angle at less than 2 degrees.

55. A vessel as in claim 19 and wherein said hull has a foil forward of at least a portion of the bowpeak below the waterline of said hull and positioned with its trailing edge spaced forward of and confronting said bowpeak portion, said foil being elongated generally in the direction along said bowpeak portion, in proportion to the width of the foil in the fore-and-aft direction, and being elongated in the fore-and-aft direction, in proportion to the thickness of the foil transverse to the fore-to-aft direction.

* * * * *